US010460324B1

(12) United States Patent
Westen

(10) Patent No.: US 10,460,324 B1
(45) Date of Patent: *Oct. 29, 2019

(54) CUSTOMIZED COMMUNICATION SCHEDULER

(71) Applicant: Square, Inc., San Francisco, CA (US)

(72) Inventor: Peter Westen, San Francisco, CA (US)

(73) Assignee: Square, Inc., San Francisco, CA (US)

(*) Notice: Subject to any disclaimer, the term of this patent is extended or adjusted under 35 U.S.C. 154(b) by 583 days.

This patent is subject to a terminal disclaimer.

(21) Appl. No.: 15/199,252

(22) Filed: Jun. 30, 2016

(51) Int. Cl.
G06Q 10/06 (2012.01)
G06Q 20/20 (2012.01)
G06Q 30/00 (2012.01)
G06F 11/07 (2006.01)
G06N 7/00 (2006.01)

(52) U.S. Cl.
CPC ....... G06Q 30/016 (2013.01); G06F 11/0709 (2013.01); G06F 11/0793 (2013.01); G06N 7/005 (2013.01); G06Q 20/20 (2013.01)

(58) Field of Classification Search
CPC .......... G06Q 10/00; G06F 17/30; G06F 11/00
See application file for complete search history.

(56) References Cited

U.S. PATENT DOCUMENTS

| | | | | |
|---|---|---|---|---|
| 7,889,666 B1* | 2/2011 | Pei | ................. | H04L 41/065 370/242 |
| 2002/0174380 A1* | 11/2002 | Mannarsamy | ...... | G06F 11/0748 714/25 |
| 2006/0259272 A1* | 11/2006 | Sattler | ................. | G06F 16/9535 702/181 |
| 2007/0143239 A1* | 6/2007 | Boyle | ..................... | G06N 5/04 706/45 |
| 2008/0294931 A1* | 11/2008 | Bantz | .................. | G06F 11/2257 714/1 |
| 2009/0157674 A1* | 6/2009 | Curry | .................... | G06F 16/217 |
| 2010/0082388 A1* | 4/2010 | Dixit | ..................... | G06Q 10/06 714/27 |
| 2010/0100412 A1* | 4/2010 | Cases | .................... | G06Q 10/06 705/7.27 |
| 2012/0078751 A1* | 3/2012 | MacPhail | .............. | G06Q 20/06 705/26.41 |

(Continued)

OTHER PUBLICATIONS

Non-Final Office Action dated Sep. 11, 2015, for U.S. Appl. No. 14/541,115, of Rosenthal, N., et al., filed Nov. 13, 2014.

(Continued)

Primary Examiner — Talia F Crawley
(74) Attorney, Agent, or Firm — Lee & Hayes, P.C.

(57) ABSTRACT

In some examples, a system and method for scheduling communication between a merchant and a service agent associated with a payment processing system (PPS). The method includes obtaining a current state of the POS application to indicate a technical failure. Based on the current state, the PPS determines a time window within which the merchant is available to communicate with the payment processing system or the POS terminal. Prior to establishing communication, if a current transaction is in progress, PPS defers the establishment of the communication channel to another time window, wherein the other time window is determined based on the transaction history or on a merchant-specified time window.

22 Claims, 7 Drawing Sheets

(56) References Cited

U.S. PATENT DOCUMENTS

| | | | |
|---|---|---|---|
| 2012/0216081 A1* | 8/2012 | Duvvoori | G06Q 10/06 714/48 |
| 2013/0036000 A1* | 2/2013 | Giordano | G06Q 40/02 705/14.27 |
| 2013/0046764 A1* | 2/2013 | Choi | G06Q 10/06 707/740 |
| 2013/0282725 A1* | 10/2013 | Rubinger | G06Q 10/20 707/740 |
| 2014/0280068 A1* | 9/2014 | Dhoopar | G06F 11/079 707/722 |
| 2015/0030151 A1* | 1/2015 | Bellini | H04M 3/5175 379/265.06 |

OTHER PUBLICATIONS

Non-Final Office Action dated Mar. 24, 2016, for U.S. Appl. No. 14/541,115, of Rosenthal, N., et al., filed Nov. 13, 2014.
Final Office Action dated Nov. 18, 2016, for U.S. Appl. No. 14/541,115, of Rosenthal, N., et al., filed Nov. 13, 2014.
Non-Final Office Action dated May 15, 2017, for U.S. Appl. No. 14/541,115, of Rosenthal, N., et al., filed Nov. 13, 2014.
Final Office Action dated Dec. 21, 2017, for U.S. Appl. No. 14/541,115, of Rosenthal, N., et al., filed Nov. 13, 2014.
Notice of Allowance dated May 2, 2018, for U.S. Appl. No. 14/541,115, of Rosenthal, N., et al., filed Nov. 13, 2014.

\* cited by examiner

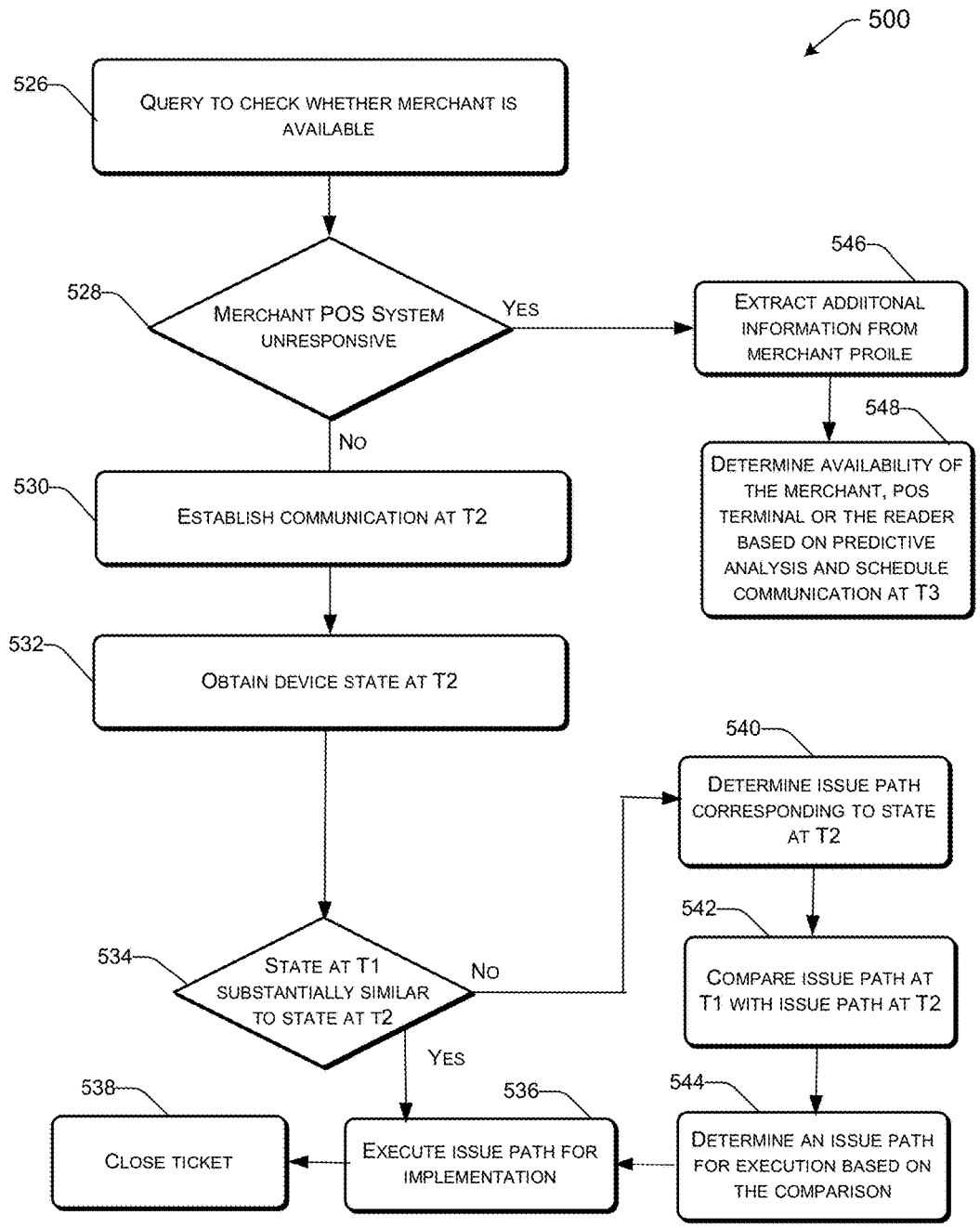

CUSTOMIZED COMMUNICATION SCHEDULER

TECHNICAL FIELD

Individuals use various hardware devices and software applications to facilitate processing of payment transactions between them and other individuals or businesses. For instance, individuals implement hardware devices like card readers and install software applications like electronic money transfer applications or inventory management applications to help them perform or settle transactions at brick-and-mortar storefronts or on e-commerce platforms.

When registering a hardware or software application for its first use, or even while its regular use, the individual may encounter unexpected technical issues and errors with the products and find it difficult to troubleshoot or debug since the underlying technology is generally very complex. Also, while troubleshooting, the individual can introduce bugs or defects that further prevent the correct operation of the software application and that may not have been present prior to the individual-initiated debugging. For instance, the bugs or defects can cause the software application to crash.

Debugging can range from fixing simple errors with the software application, to performing tasks of data collection, analysis, and scheduling updates for the software application. Without crashing or otherwise suffering from a bug, an application can still present an error condition to the individual. For instance, the application may be unable to communicate with an input and/or output device of an electronic device. For example, an application may be unable to communicate with a printer when the user tries to print a document using the application. For another example, an application may be unable to communicate with a network interface in order to download updates for the application.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

FIGS. 5A and 5B depict sequence flow methods that illustrate the method of opening a ticket on behalf of the payment entities, such as the payment object reader and the POS terminal, and determining availability of the merchant and the service agent, according to an example embodiment of the present subject matter.

DETAILED DESCRIPTION

Figure 1:
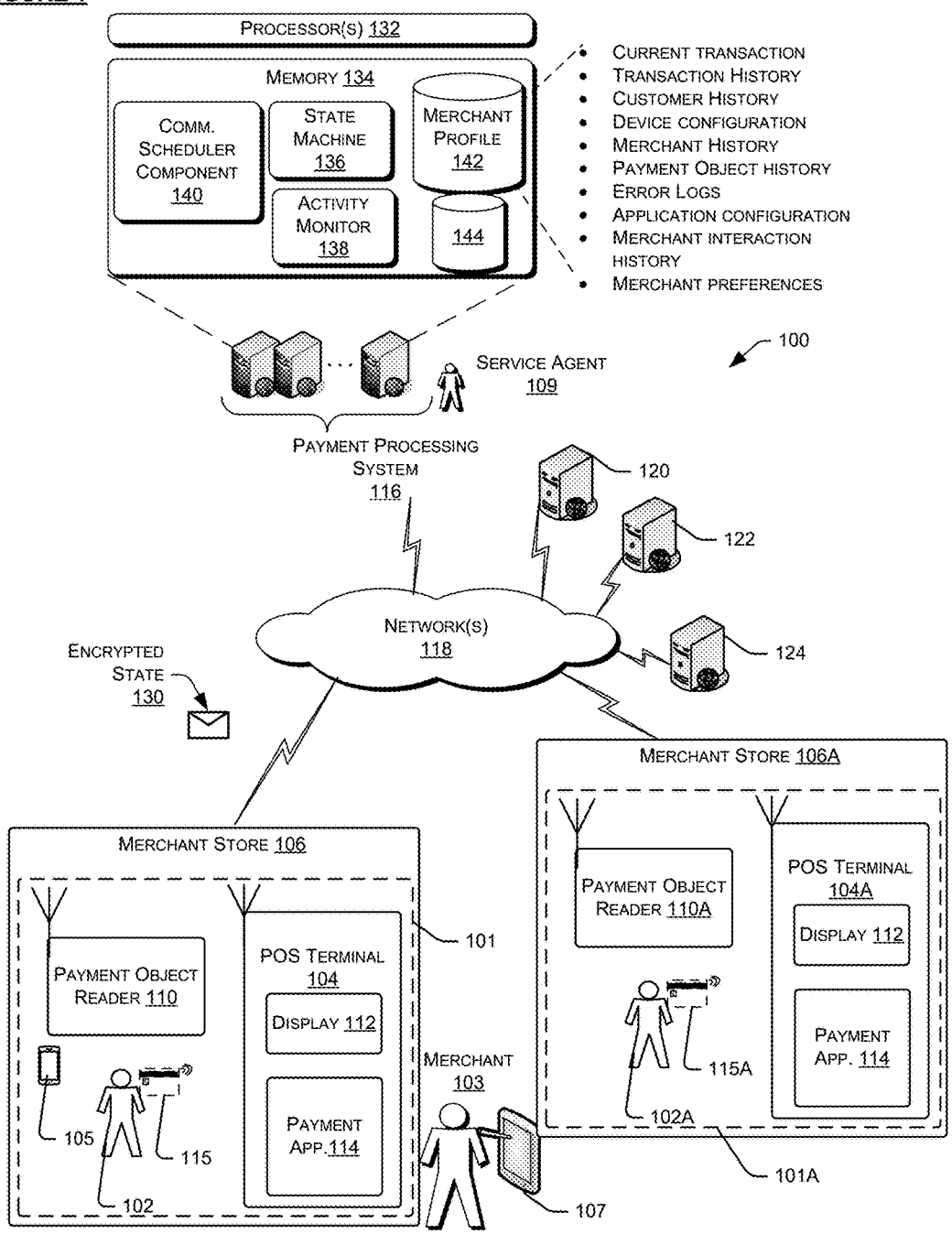
FIG. 1 is a block diagram illustrating an example environment for establishing a communication channel between a payment entity, e.g., a point-of-sale (POS) terminal, and a payment object reader, with a payment processing system to facilitate scheduling communication between the two for diagnosis and resolution of a technical failure, according to an embodiment of the present subject matter.

Embodiments for scheduling and establishing communication between a user and a technical support agent ("customized communication scheduler") are described herein. The user can be a user of: a payment device (such as a point-of-sale terminal, a payment object reader, or a mobile communication device executing a payment application); or a payment application (such as an application for electronic money transfer, an application for managing inventory of items at an online storefront, an application for employee and customer management, a mobile register software application running on a mobile communication device to enable check out of purchases, and the like). The point-of-sale (POS) terminal, reader, and the payment applications allow merchant locations to accept payments for a product or a service; process the payment transaction for which the payment is made, e.g., by connecting to banks; and facilitates transfer of funds from the banks to furnish the payment transaction. The POS terminal is generally connected to the payment object reader, which can read different kinds of payment objects.

The payment object reader initiates a payment transaction by receiving payment through a payment object for a product or service selected through a payment application. The payment object can be any payment mechanism, for example, a debit card, a credit card, a smart-card conforming to a Europay-MasterCard-Visa ("EMV") standard, a radio frequency identification tag (i.e., near field communication enabled objects), a biometric payment instrument, a virtual payment card stored on a device such as a smart phone and transmittable, for example, via near field communication (NFC). Once connected or paired with the POS terminal, the payment object reader can transmit the data read off the payment object to the POS terminal, which then processes the data to complete a payment transaction for a product or service. The POS terminal can be a mobile device or a desktop device. Mobile devices include smart phones, tablet computers, laptops, or other mobile data processing apparatus. The following paragraphs describe few of the problems with the current infrastructure that supports users requesting technical support for their products or services.

When setting up and/or using the POS terminal, the reader, or the payment application, the user may encounter technical issues or errors. These devices have different configurations and capabilities and therefore may work differently. As such, the technical issues can be unique to the device and require a unique approach to troubleshooting.

The users may themselves attempt to debug or troubleshoot the technical issue. However, in some instances, such user-initiated attempts can directly or indirectly cause the issue to get worse or alter from the original issue into a new issue or both.

Sometimes, the user can implement a self-guiding tool or select a diagnostic manual to walk them through the steps for troubleshooting. The user goes through the rather lengthy troubleshooting manual and manually selects an issue from a menu of known issues, which best represents the user's actual issue. However, since the issues are generally unique to the device and application executing on user's device, and the configuration and functionality of these devices change constantly over time, the known issues are not always up to date and cannot sufficiently cover the actual and unique issue faced by every particular user. Thus, the "troubleshooting paths" or specific troubleshooting (or remedial) steps catered towards solving the known issue may not solve the user's actual issue. The troubleshooting path generally recommends the user to make certain software and hardware configuration changes. However, such changes may make the actual issue irreversible and further complicate the issue. As a result, many cookie-cutter solutions often found in outdated or generic manuals are usually not accurate and cannot best represent the user's needs.

For this, the hardware devices and software applications are usually connected to technical support management mechanisms, which are generally configured to connect the user to a support agent trained in a variety of issues, such as technical failures in the hardware or software. In a typical technical support management set-up (e.g., call center, service desk, electronic support center, and so forth) of a large organization (e.g., a business organization, an educational organization, or a government organization), tens to hundreds of thousands of calls may be received monthly from users regarding various issues. While most calls are relevant, some calls to report issues may be frivolous, an easy-fix (such as requiring a mere toggle-on/off of a switch), directly related to a known issue for which proper troubleshooting path or troubleshooting documentation is available, or no longer valid after ten minutes of the call (for example, some issues may have an expiration date). However, conventional methods provide no or minimal ways to categorize and filter calls based on the factors mentioned above. As mentioned below, the filtering is usually based on the complexity of the issue, and/or the level of skill required to service the issue, and all calls are attended to.

When the user places a call to communicate with a support agent, it has typically been necessary to dial a number and traverse a phone tree of a call distribution system to get routed to a support agent. The call distribution system tracks availability of a number of service agents trained to solve hardware, software and administrative issues, monitors the queue of users waiting to be attended to, and connects the user to a service agent who is free, that is, not handing other calls at the moment. But in some cases, if the queue is busy, the call-distribution system indicates that the user may have to wait for either an undisclosed or an estimated period of time before a support agent becomes available. This is both undesirable and frustrating for the user to learn after traversing through the phone tree and additional steps.

In some cases if the wait-time is long and there are several other users ahead of the user in the call queue, the user is given the option to receive a callback when a support agent is available to allow the call distribution system to better manage the queue. For this, the user provides their phone number, allowing them to essentially wait their turn without having an active phone call open during their time in the queue.

The conventional technical support management mechanisms are generally configured to place calls at a rate that will minimize calling agent idle time. Essentially a dialer screens out busy calls, calls which ring with no answer, or machine answered calls, only connecting live answered calls to a calling agent or service agent. It is integral to the effort to optimize the efficiency of the calling service agent to relieve him/her of dealing with ring no answer, busy and calls otherwise unsuccessful in contacting a human. However, the exact timing of that call is not under the user's control, however, and may come at a moment when taking the call is not possible. These implementations ignore that the user may not be available at the second time when the service agent calls the user—this results in further inconvenience for the user and costs for the company as the service agent is being paid for an incomplete call. Further, that time slot could have been used to attend to another user who was available.

The user, upon being connected to the support agent, describes the issue based on his knowledge of the issue. In addition, conventional customer support calls require all information about the customer-identifying information, details about what issue for which they need support, etc.—to be exchanged during the call. Sometimes, the first support agent classifies the issue into one of the known categories and accordingly, routes the call to another support agent expert in handling the specific issue classified by the support agent. Moreover, support agents may not be properly trained to classify a call to all the possible categories. In addition, as new categories are added, the training involved to re-train support agents to recognize the new categories can involve substantial costs. If not trained properly, support agents tend to bias classifying of calls to the top of a list, toward a catch-all "other" category, or toward overly general categories (such as a "hardware" or "software" category) without specificity. Also, if the list of categories is not complete, then the classification performed by the support agents would be incomplete. Also, the available categories in the list may not accurately describe a particular issue being faced by the user.

Another technique of categorizing calls is based on using an expert off-line to look at information pertaining to the calls or a sample of the calls. The expert would then attempt to label the calls into various issue categories. Using an expert, or plural experts, to label calls received by a customer support organization can be time-consuming, labor-intensive, and expensive. Moreover, experts may be familiar with certain issues, while not very familiar with other issues. As a result, classification performed by such experts may be biased toward certain categories, resulting in somewhat inaccurate categorizations.

Another approach is to survey customers, in which customers are asked to fill out customer surveys or to answer questions. This process is relatively intrusive, and many customers may not be willing to participate in the survey. Moreover, the information collected from customers may be incomplete, as the customers may not be properly motivated to enter all information, or the customers may interpret different questions differently, and thus provide differing answers based on the different interpretations.

As a result of unreliable or inefficient classification of calls using conventional techniques, prior computer support systems have been unable to reliably or efficiently prioritize problems to better focus the resources of the organizations.

Assuming the user gets patched to the correct service agent, the user can be asked to describe the issue again to another service agent. In some cases, there are times when the user may not have command of the technical jargon and may not be able to describe the issue accurately, with little or no mutually understood terminology. Based on the described issue and much back-and-forth between the support agent(s) and the user for clarifications, the technical support management typically attempts to identify or provide educated guesses to problems that may exist in products or services. In response to these problems, the technical support management attempts to solve the problems, such as by providing documentation on web portals to enable customers to solve problems on their own or by providing various search and diagnostic tools. Such identification of issues performed by support agents is usually not accurate, since support agents are typically under time pressure to resolve a call as quickly as possible.

Thus, conventionally, procedures and mechanisms have not been provided to efficiently and accurately identify issues that are associated with the calls received by the technical support management. When the onus is on the user to describe the issue, the result cannot be favorable at all times. Furthermore, the callback options are not configurable to the availability of the user, thus patching a call at the time when user is unavailable rather than likely to be available to take the call. Also, resources are unnecessarily allocated to unavailable users, which can actually be diverted to available users. Procedures and mechanisms have also not been provided for efficiently and accurately quantifying received calls by a technical support management down by different types of issues to enable the customer support organization to quickly determine which issues have higher priority and thus should first be addressed. Without the ability to efficiently and accurately identify and quantify issues, a technical support representative may waste resources trying to address an issue that should have lower priority than other issues.

To this end, the customized and automatic scheduling technology described herein alleviates at least the problems identified above by facilitating at least the following:

(a) detect an issue with a user-associated device (which in one example can be the same as user's communication device with which the communication is being made with the service agent) when a first communication is initiated by the user, where detection includes obtaining details of hardware and software configuration of selected applications executing on the device or devices associated with the user;

(b) determine a level of skill required for troubleshooting the detected issue based on complexity of the detected issue;

(c) if the skill level satisfies a threshold (for example, matches, is greater than or lesser than, etc.), determine if there is a known troubleshooting path that can be remotely applied or recommended without establishing user-service agent's device communication, and if there is no known troubleshooting path, generate an troubleshooting path for the user to implement and subsequently, notify the troubleshooting path to the user through email, phone call, text, or the like;

(d) if the skill level does not satisfy a threshold, determine, for example, through predictive analyses the user availability and/or service agent availability, for example based on historical data, such as transaction history, and generate the troubleshooting path for the service agent and user;

(e) establish communication between the service agent's and the user's communication devices;

(f) if the user is unavailable to receive the communication or disconnects the established communication, the scheduler determines the next slot of availability for both the service agent and the user. The next slot may be determined based in availability of both the user and the service agent and/or the categorization of the issue. Alternatively, instead of detecting a disconnection initiated by the user, in some cases, the scheduler may check whether the predicted available slot is a viable option, for example, at a time before the call is scheduled to happen. In case the scheduler detects an event (for example, the user is performing an activity on the device or application and is in the middle of processing through activity tracking, or on the move via location tracking), the scheduler can wait until the event is finished or attempt to call at a related number or device;

(g) once the user does confirm that the time is convenient and the communication is established between the user and the service agent, that is the call is connected, the service agent's device generates an additional notification to appear on user's device. That notification arrives, for example, immediately, during and for the duration of the communication requesting temporary access to the user's activity within the mobile application. On receiving an engagement from the user approving access, the service agent's device or server triggers the mobile application to enter a mode in which it relays information about its state and the user's actions back to the server, for presentation to the support agent. In this way, there is no need for the difficult and cumbersome process of describing what to look for in the application and what feedback the application is providing in response. The application could also take screenshots of itself and relay those to the support representative for more complete visual feedback. For example, in some instances, the service agent's device can remotely perform automated troubleshooting steps based on a detected known issue/troubleshooting path and the user device characteristics; and (h) the diagnostic component of the scheduler can also compare past states (obtained when the user first attempts to establish communication) and current state (obtained when the user finally connects with the server). On comparing, if the states of the device and/or software application are different, for example due to software updates or changes to device settings during the two call events, the server may initiate a request for restoring the application or device to its previous state or for updating the troubleshooting path accordingly.

For at least the processes described above, the scheduler also facilitates generation and display of notifications, alerts, and selectable fields for the user and the service agent on a graphical user interface associated with their communication devices. For example, the user's communication device can include within the mobile application an option to request support by establishing connection with a service agent, for example by tapping a software or hardware button on the device or within the mobile application. Thus, a selectable icon when selected can place a call to the service agent, for example. In another implementation, the selectable icon when selected contacts a payment processing server (hereinafter referred to as PPS) with contextual information. The contextual information includes:

the device information, including the type of device on which the application is running, the hardware and software settings, the communication ports open for communication like Bluetooth, Wi-Fi, the device configuration, and so on;

the software application information, including the version of application, software application configuration, other applications executing on the device; any indication of virus or malware, software settings, and so on;

the user's information, including their phone number (which is associated with their account), any other devices associated with the user, the user's PAN, user's transaction history over a period of time, trends in transaction history, location, geographical location of stores, history of software downloads, and so on;

contextual information about the user's issue, e.g. what version of the application is running, what screen is being viewed, and what information was presented for which support was offered;

the user's selection of call-back options, e.g. use an alternate phone number, call back ASAP, or call back in a certain time window offered by the server.

The graphical user interface can also present push notifications or messages to the user; "Square is ready to handle your support request. Is now a good time for the phone call?" with attached actions (e.g., "Yes, call now" to show availability, or "Not right now, call in ten minutes" for rescheduling, "Don't need assistance," if the user has figured out a solution), and so on. A directly placed call could only be answered or ignored, whereas a notification can offer and relay user responses.

If the users selects "Yes" then the incoming call would arrive immediately, connecting the user with a service agent that already has access to all the relevant information supplied when the request was initially made. If the user selects "Later . . . " then the application is opened with a new set of callback options: "Try again in 5 minutes", "Try again between 3-4 PM" (for example), and "Cancel this support call." The latter option would show a set of options for the user to provide feedback on why they no longer need support, e.g. "The problem went away," "I figured it out on my own," and "I will contact support again later." In one implementation, if the user does not engage with the selectable icon for a predetermined time, the lack of interaction can be assumed to be equivalent to deferring 5 minutes, then to the next callback window on a subsequent ignore, then canceling the request on a final ignore. After placing their request, the user would also be provided the option to add the company's phone number to their device's address book, so that when the call arrives, it will be identified by name.

The present subject matter proposes the integration of at least the aforementioned features into a seamless and convenient mechanism for technical support. With relation to the problems identified previously with conventional systems and methods, the software application itself becomes an active and cooperative component of the support experience, rather than the subject of it. The identification of issue is not based on user judgment alone and is now based on the server-detected issue as well. For example, a call distribution component in the server now determines availability that works for both the user and the service agent. Accordingly, examples of the present subject matter serve to improve the functioning and capabilities of computer support systems through streamlined and managed remote technical support. For instance, merchants that are unable to process payments on their merchant terminal are able to receive timely (i.e., due to scheduler) and relevant (i.e., catered to their specific device) technical support remotely and with minimal disruption to their day-to-day business activities.

The description hereinafter describes the devices and applications to be related to payment technology. However, it will be understood, that the technology can be extended to any device and application that is requesting troubleshooting, technical support, or any kind of diagnostic tests.

In one implementation, payment object readers and/or POS terminals, mobile payment applications, hereinafter referred to as payment devices or payment entities, which implement the present techniques, include a state machine to detect state of payment device and payment application, in terms of power signal values, device or application characteristics, hardware and software configuration, and the like, and transfer such states to a PPS. In another implementation, the PPS includes the state machine to query the payment devices at various time instants, or in response to user engagement, for example with a "support" icon.

The customized and automated scheduler technology can also be configured to operate irrespective of the kind of payment object reader, POS terminal, web applications, mobile applications, POS topologies, payment cards, computer networks, and environments. The customized and automated scheduler technology described herein can be configured to operate in both real-time/online and offline modes. Furthermore, even though Bluetooth or Bluetooth Low Energy has been used to describe certain embodiments, other wired or wireless protocols, such as NFC, Wi-Fi, etc., can be used.

The following description provides specific details for a thorough understanding and enabling description of these embodiments. One skilled in the relevant art will understand, however, that the embodiments discussed herein may be practiced without many of these details. Likewise, one skilled in the relevant art will also understand that the embodiments can include many other features not described in detail herein. Additionally, some well-known structures or functions may not be shown or described in detail below, so as to avoid unnecessarily obscuring the relevant description. Some of the recurring terms are now defined.

In some implementations, transmitted instead of received power levels are used. In yet another implementations, other forms of signal measurements or identifiers, for example, in other frequency bands, to identify and pair with a reader.

In the technical support context, a "ticket" represents an instance of an interaction between a user (e.g., a customer, patron, subscriber, visitor, member, employee, participant, constituent, supplier, partner, etc.) and an organization (e.g., company, manufacturer, store, provider, employer, representative, etc.) that is indicative of satisfaction or dissatisfaction with something at least partially under control of the entity or another party the entity represents, A "category" (e.g., problem, issue, concern, etc.) represents an underlying reason for the interaction (such as satisfaction or dissatisfaction that led to the case), Such categories can reflect problems associated with a product or service (e.g., defects in payment product design or manufacture, hardware problems, software problems, hard disk problems, battery problems, and so forth), difficulties in understanding how to correctly use a product or service, difficulty obtaining a product or service, difficulty obtaining information about a product or service, concerns about the value of a product or service, desires for features lacking in a product or service, poor experience interacting with the entity, and so forth. Other entity/customer relationships (e.g., employer/employee, government/constituent) will have similar sets of categories reflecting the types of concerns the customers have and the types of control the entities have. In other environments, other types of categories are employed.

Although described in the context of a technical environment that includes technical support representatives or agents receiving calls at payment service stations associated with payment object reader and POS terminals, other embodiments of the invention are applicable to other types of systems for other types of organizations (e.g., educational organizations, government organizations, business organizations, financial organizations, and so forth).

As used here, the term "pairing" or "associating" refers to a process in which the POS terminal and the payment object reader establish a communication channel with each other using wireless communication protocols, for example, Bluetooth®, Bluetooth Low Energy®, Wi-Fi®, etc. The POS terminal and the payment object reader each includes a transceiver capable of transmitting data between them once "paired."

As used herein, RSSI, or "Received Signal Strength Indicator", is a measurement of how well the payment device can hear a signal from an access point or router, such as Wi-Fi card of the payment object reader. RSSI is a term used to measure the relative quality of a received signal to the POS terminal, but has no absolute value.

The terms "connected" or "coupled" and related terms used throughout the description are used in an operational sense and are not necessarily limited to a direct physical connection or coupling. Thus, for example, two devices may be coupled directly, or via one or more intermediary media or devices. As another example, devices may be coupled in such a way that information can be passed there-between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one implementation of the disclosed technology, and may be included in more than one implementation. In addition, such phrases do not necessarily refer to the same embodiments or different embodiments.

The term "component" or "engine" refers broadly to general or specific-purpose hardware, software, or firmware (or any combination thereof) components. Components and engines are typically functional components that can generate useful data or other output using specified input(s). A component or engine may or may not be self-contained. Depending upon implementation-specific or other considerations, the components or engines may be centralized or functionally distributed. An application program (also called an "application") may include one or more components and/or engines, or a component and/or engine can include one or more application programs.

The term "cause" and variations thereof, as used throughout this description, refers to either direct causation or indirect causation. For example, a computer system can "cause" an action by sending a message to a second computer system that commands, requests or prompts the second computer system to perform the action. Any number of intermediary devices may examine and/or relay the message during this process. In this regard, a device can "cause" an action even though it may not be known to the device whether the action will ultimately be executed or completed.

The term "communication network" may be any type of network known in the art, such as a local area network or a wide area network, such as the Internet, and may include a wireless network, such as a cellular network, a cloud network, a local wireless network, such as Wi-Fi and/or close-range wireless communications, such as Bluetooth and Bluetooth low energy, near field communications (NFC), a wired network, or any other such network, or any combination thereof. Accordingly, the network may include both wired and/or wireless communication technologies, including Bluetooth, Bluetooth low energy, Wi-Fi and cellular communication technologies like worldwide interoperability for microwave access (Wi-MAX), 3G, 4G, CDMA, digital subscriber line (DSL), etc., cloud computing technologies, as well as wired or fiber optic technologies. Additionally or alternatively, the communication network may be a mesh network. For example, in a wireless local area network (WLAN), network devices may be configured to receive and forward communications, which are ultimately destined for a different device. These types of networks are generically referred to as "mesh" networks, where network nodes may form a "mesh" of paths for which communications may travel to reach their destination. Wireless networks may use beacon transmissions to advertise the network's existence, as well as provide information about the network and capabilities associated with the network. Different kinds of beaconing mechanisms may be used, for example, one for infrastructure mode networks (also called basic service set (BSS) networks) and one for ad-hoc mode networks (also called independent basic service set (IBSS) networks). In infrastructure networks, access points (APs) are the entities responsible for generating beacons whereas in ad hoc networks, all network nodes (including user stations) participate in the generation of beacons. The ad hoc network beacons (referred to as IBSS beacons) are used to advertise the network (which consists of all the nodes) as a whole while the infrastructure network beacons (referred to as BSS beacons) are generated by an AP and meant to advertise the existence of only that individual AP. Components used for such communications can depend at least in part upon the type of network, the environment selected, or both. Protocols for communicating over such networks are well known and are not discussed herein in detail.

Additionally, as used herein, the term "payment card," "payment object," or "payment instrument" refers to a payment mechanism that includes a debit card, a credit card, a prepaid gift card, or the like, a smartcard that has an embedded integrated circuit chip (e.g., Europay-Master-Card-Visa (EMV) card), a proxy card, or any card that functions as a combination of any of these mechanisms. The term "proxy object" as used herein refers to a card that may or may not bear a card number/account number that appears to be that of a real credit or debit card account (i.e., it is in the correct format), but where that card/account number is actually only a proxy for the customer's real card/account number. Another type of payment object is a biometrically identifiable instrument, which may be initialized using a person's finger (e.g., for fingerprint recognition), face, iris or retina, heartbeat, etc.

Alternatively, the payment object can be a software instrument or virtual instrument, such as a virtual wallet configured to initiate contactless payment transactions, e.g., a key fob, a mobile device having an RFID tag, etc. Other examples of payment object may also include a prepaid card, a gift card, a rewards card, a loyalty points card, a frequent flyer miles card, checks, cash, or in general, any kind of financial instrument that holds financial value or provides a promise to pay at a later time. Thus, a payment object transaction (also referred to as payment card transaction) may be any be a transaction where a merchant or a user swipes the user's credit card through a payment object reader in exchange for a product or service offered by the merchant.

The term "swipe" here refers to any manner of triggering a payment object reader to read data from a payment object, such as by dipping into, tapping, hovering, bringing in close contact or passing the payment object into or through a payment object reader.

The term "broadcasting" refers to the modes of operation of the Bluetooth enabled device to enable connection with neighboring devices and can be either discoverable mode or advertising mode. Discoverable mode is a state within Bluetooth technology integrated devices that enables Bluetooth devices to search, connect and transfer data with each other. Discoverable mode is used to propagate the availability of a Bluetooth device and to establish a connection with another device. In some cases, the device can also be in the "non-discoverable" mode, which prevents devices from being listed during a Bluetooth device search process. However, a non-discoverable Bluetooth device is visible to devices that know its address or can discover its address.

The term "advertising" is meant to refer to another mode of operation of the Bluetooth enabled device. Both broadcasting and advertising help initiate, establish, and manage the connection with other devices. If the device just needs to communicate the status of a few parameters or alarms and does not absolutely require acknowledgement from other side, the BLE advertising mode may do the job with just a few commands sent to the BLE controller. When advertising mode is enabled, the BLE device will start to transmit special packets carrying advertising information as Payload Data Units (PDU) on the RF channels dedicated for this purpose. BLE is utilizing a common structure of over the air packets for advertising and data channels. An advertising channel PDU has a header and actual payload. The header contains information about the size of the payload and its type: advertising channels are used for exchanging information before making a connection between devices. Hence, different payload types are supported to broadcast information about the device's ability (on inability) to support a connection, to request more information or to respond with additional device information and to request the initiation of a data connection with another device.

Reference to an "embodiment" in this document does not limit the described elements to a single embodiment; all described elements may be combined in any embodiment in any number of ways. Furthermore, for the purposes of interpreting this specification, the use of "or" herein means "and/or" unless stated otherwise. The use of "a" or "an" herein means "one or more" unless stated otherwise. The use of "comprise," "comprises," "comprising," "include," "includes," and "including" are interchangeable and not intended to be limiting. Also, unless otherwise stated, the use of the terms such as "first," "second," "third," "upper," "lower," and the like do not denote any spatial, sequential, or hierarchical order or importance, but are used to distinguish one element from another. It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to non-transitory tangible, physical objects that store information in a form that is readable by a computer. These terms exclude any transitory wireless signals, wired download signals, and any other ephemeral signals. The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It should also be appreciated by those skilled in the art that any block diagrams, steps, or sub-processes herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown. The order in which the methods are described are not intended to be construed as a limitation, and any number of the described method blocks can be deleted, moved, added, subdivided, combined, and/or modified in any order to implement the methods, or an alternative combination or sub-combinations. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples; alternative implementations can employ differing values or ranges. Furthermore, the methods can be implemented in any suitable hardware, software, firmware, or combination thereof.

While certain devices, e.g., the payment object readers and POS terminals are shown as including distinct components, this is merely for ease of illustration and not intended as limiting. In various implementations, the payment object readers and POS terminals may be identical, similar or distinct. Moreover, the components shown and described for the payment object readers and POS terminals may be implemented as more components or as fewer components and functions described for the components may be redistributed depending on the details of the implementation. Additionally, in some implementation, there may be several, hundreds, thousands, hundreds of thousands, or more, of the payment object readers and the POS terminals. Further, in some implementations, configuration, structure, and operational characteristics of the payment object readers and/or POS terminals may vary from device to device. In general, payment object readers and the POS terminals can each be any appropriate device operable to send and receive data, requests, messages, electronic messages, text messages, alerts, notifications, pop-up messages, push notifications, or other types of information over the one or more networks or directly to each other.

The scheduling technology introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to cause one or more processors to perform the methods, variations of the methods, and other operations described here. The machine-readable medium may include, but is not limited to, floppy diskettes, optical discs, compact disc read-only memories (CD-ROMs), magneto-optical discs, read-only memories (ROMs), random access memories (RAMs), erasable programmable read-only memories (EPROMs), electrically erasable programmable read-only memories (EEPROMs), application-specific integrated circuits (ASICs), magnetic or optical cards, flash memory, or other type of media/machine-readable medium suitable for storing electronic instructions. Various embodiments will now be described in further detail with the help of one or more figures.

Turning now to the Figures, FIG. 1 is a network environment 100 illustrates a point-of-sale (POS) system(s) 101, comprising of payment devices, such as a POS terminal 104 and a payment object reader 110, which may or may not be manned by a merchant 103 at a store 106, such as store 106-1. The POS system 101 can communicate with another entity either through its own communication components or another communication device, hereinafter referred to as merchant communication device 107, such as mobile phone or mobile tablet of the merchant. The merchant 103 initiates communication with a service agent 109 of a payment processing system (PPS) 116 for technical support related to the POS system 101 or any of the applications therein.

In some cases, a merchant 103 may have stores and POS establishments at several locations, and as such there can be several POS systems 101 connected to the same merchant account. As shown, POS system 101A can include POS terminal 104A and a payment object reader 110A. For example, POS system 101 can be at one geographical location as store 106, and POS system 101A can be at another store 106A. Thus, when the merchant 103 initiates communication from one location, the PPS 116 can make the determination of whether the technical support request relates to one merchant location, selected locations (as indicated by the merchant) or all locations connected to the merchant's account or profile, which may be stored in the PPS 116.

The POS terminal 104 can be a mobile device or a desktop device. Mobile devices include smart phones, tablet computers, laptops, mobile wearable devices like Apple® watch or a Fitbit®, or other mobile data processing apparatus. In one implementation, the POS terminal 104 can be a POS terminal operated and managed by a merchant(s) 103. Furthermore, the POS terminal 104 can be of a varied hardware and/or software configuration, such that POS terminal 104 may be an Android device whereas POS terminal 104A may be an iOS device. In another example, POS terminal 104A can be a cellphone whereas the POS terminal 104A can be a tablet computer. The POS terminal 104 can have varying hardware and software configurations, for example the dissipated and detected power levels can differ. If the POS terminal 104 is an Android device, power levels can be around 200 units, meanwhile the Apple device can have power levels of 350. These are only examples and actual values may differ. Thus, the POS terminal 104 has device characteristics that can be characterized by engineering tolerances, hardware imperfections inherent to analog components of the device, radio frequency response to certain signals, which make it unique with respect to another seemingly similar device. The device characteristics can also be unique identifiers associated with the device, such as device name, device identification number, and the like. The device characteristics or profiles can also relate to software configurations, such as applications executing on the POS terminal 104 and their software versions. The device characteristics or profiles can change states from one time instant to another. Such device characteristics can be used for device identification or fingerprinting, and are useful in determining, especially as states change, what an underlying technical issue could be. The POS terminal 104 can be a electronic point-of-sale system that is connected to a payment object reader 110 capable of accepting a variety of payment instruments, such as credit cards, debit card, gift cards, near-field communication (NFC) based payment instruments, and the like. The POS terminal 104 can be connected to a central processing server, hereinafter referred to as the payment processing system (PPS) 116, to obtain inventory of available products and services and risk parameters. The POS terminal 104 can work in both online and offline modes to allow the merchant 103 to both access the inventory and provisionally process payments whether or not the communication network between the PPS 116 is established or not.

The POS terminal 104 may comprise any sort of mobile or non-mobile device that includes an instance of a merchant application payment 114 that executes on the respective device. In some instances, the merchant application can execute on a device separate from the POS terminal 104, for example, the merchant communication device 107. The merchant application may provide POS functionality to the POS device 104 to enable the merchant 103 (e.g., an owner, employees, individual user, etc.) to accept payments from the customers 102 associated with payment instruments (such as payment objects and/or communication devices 105). The POS terminal 104 can include a display 112 for displaying notifications, visual cues, and interactive fields to interact with the PPS 116.

The merchant application can also include interactive fields, for example on display, to allow the buyer to request for technical support. For example, the interactive fields, when selected or pressed or otherwise engaged, can establish a communication channel between the merchant 103 and the service agent 109. The communication can be in the form of text, electronic mail, phone call, or any other kind of notification. The merchant application, too, has application characteristics or profiles associated thereto. The merchant application characteristics and profiles, include for example, application version history, status of APIs or handlers executing on the application, error log, transaction log, and so on. The states of the merchant application can also be sent to the PPS 116 from time to time. Analysis of states helps determine if there are any errors in the application. While there are merchant application characteristics and device characteristics, most applications execute on devices. Therefore, for the purpose of this application, person skilled in the art can assume device characteristics or profiles and device states to include merchant application characteristics or profiles.

In some types of businesses, the POS device 104 may correspond to a store or other place of business of the merchant, and thus, may be a fixed location that typically does not change on a day-to-day basis. In other types of businesses, however, the POS system 101 may change physical location from time to time, such as in the case that the merchant operates a food truck, is a street vendor, a cab driver, etc., or has an otherwise mobile business, e.g., in the case of merchants who sell items at buyer's homes, places of business, and so forth. Accordingly, the device characteristics can also include the geographical location of the merchant and the merchant communication device.

As mentioned before, the POS terminal 104 is connected to a payment object reader that receives the payment object. The payment object reader 110 may be a magnetic stripe card reader, optical scanner, smartcard (card with an embedded IC chip) reader (e.g., an EMV-compliant card reader or NFC enabled reader), radio frequency identification (RFID) reader, or the like, configured to detect and obtain data off any payment object. Accordingly, the payment object reader 110 may include hardware implementation, such as slots, magnetic tracks, and rails with one or more sensors or electrical contacts to facilitate detection and acceptance of a payment object. Additionally or optionally, the payment object reader 110 may also include a biometric sensor to receive and process biometric characteristics and process them as payment instruments, given that such biometric characteristics are registered with the payment processing system 116 and connected to a financial account. The reader too has characteristics that can be tracked, detected and monitored either through another application on the POS terminal or by engagement with a button, such as a start button and the like. The reader characteristics include registration number associated with the reader, the type of object inserted in the readers, whether communication ports are enabled, whether Bluetooth is enabled, and so on.

For the sake of completeness, the network environment 100 is also shown to include buyer 102 and 102A at different locations each equipped with a payment object. The buyers 102 and 102A are collectively referred to as buyer 102. In an example scenario, the buyer 102A approaches the POS terminal 104 being manned by a merchant 103, to pay for a product or service in a dedicated checkout area within a merchant store 106 or 106A. A payment transaction can include reading payment data off payment objects 115, for example, credit cards, debit cards, gift cards, drivers license cards, identification cards, or in general, any object with financial information stored thereon or connected to financial information stored on an external server. In the example scenario, the merchant 103 (in case of a manned store) or the buyer 102 (e.g., in a self-checkout aisle) selects at least one product from the inventory displayed on a display 112 of the POS terminal 104 and moves on to a "check-out" page to finalize the purchase transaction. At this stage, the buyer 102 may provide a payment object 115, such as a payment card or instrument (e.g., debit, credit, prepaid, checks, etc.), cash (or its equivalent), securities, biometric payment instrument (based on any kind of biometric characteristic, e.g., fingerprints, voice print, speech patterns, facial geometry, facial image, genetic signature, retinal iris scan, etc.), virtual currency, rewards, points, miles, etc., and/or other payment options, into a payment object reader 110 to pay for the items purchased. In the implementations described herein, the payment object 115 is a chip card with integrated circuitry that is based on EMV protocol. In the online mode, the EMV card is able to communicate via a terminal with the corresponding issuing entity (for example the bank that issued the card) in order to verify that the current transaction is legitimate. In contrast, in the offline mode, the EMV card applies pre-stored verification criteria to decide whether the transaction should be approved/authorized or declined. As described herein, the pre-stored verification criterion is distributed amongst various entities, such as the payment object 115, the POS terminal 104 and the payment object reader 110.

A customer(s) 102 provides the payment object 115 to pay for a product or service offered by a merchant 103. The merchant 103 introduces (swipes, taps, dips, inserts, or otherwise brings in proximity) the payment object 115 in a payment object readers 110 or 110A (collectively referred to as payment object reader(s) 110), which are or can be wirelessly connected to at least one of the POS terminals 104-1, 104-2, . . . 104-N (collectively referred to as POS terminal 104) at a merchant location(s) to process the transactions for which the payment object 115 is introduced. The POS terminal and the payment object reader are separate entities and require connection to send and receive information between each other and can be paired or otherwise connected to each other, for example through Bluetooth or Wi-Fi technologies.

As mentioned before, the payment object reader 110 can process payment objects 104 having magnetic stripe cards or smart chip cards. Smart chip cards can be processed according to the EuroPay, MasterCard, Visa (EMV) protocol. In some implementations, the payment object reader 110 processes cards using Near Field Communication (NFC) hardware and the NFC protocol. Thus, the payment object reader 110 may be a magnetic stripe card reader, optical scanner, smartcard (card with an embedded IC chip) reader (e.g., an EMV-compliant card reader or NFC enabled reader), radio frequency identification (RFID) reader, or the like, configured to detect and obtain payment transaction data off a payment object 115.

The payment object reader 110 implements one or more mechanisms to capture data from and off the payment objects 115 and to communicate the captured data (hereinafter referred to as "payment object read-data" or "read-data") wirelessly to the POS terminal 106. For example, the payment object reader 110 may include hardware features, such as slots, magnetic tracks, and rails with one or more sensors or electrical contacts to facilitate detection and acceptance of a payment object 115. In some cases, to allow exchange of data, such as read-data, the POS terminal 106 connects to a specific payment object reader, e.g., payment object reader 110A from amongst a plurality of payment object readers 110, over wireless local area network or shorter range wireless communication network, and can occur in many forms, for example, Bluetooth, Bluetooth Low Energy, Wi-Fi, NFC, etc. To allow this, both the POS terminal 106 and the payment object reader 110 include transceivers and antenna (not shown in this figure). Once connected, the payment object reader 110 can then broadcast data to the POS terminal 106 and vice-versa through the established channel. In some implementations, the payment object reader 110 and the POS terminal 106 undergo a pairing process before establishing communication to verify a source and destination for data transfer.

After receiving payment data, the data is sent to the PPS 116 for further processing. On receiving authorization or contemporaneous to the authorization step, the POS terminal 104 or the payment processing system 116 on behalf of the merchant, generates a fund transfer request for the amount of product or service requested by the merchant 103. The PPS 116 can be a cloud computing environment, a virtualized computing environment, a computer cluster, or any combination thereof. The PPS 116 can analyze the fund transfer request based on a plurality of rules stored in a knowledge database (not shown) before sending the fund transfer request to a computer system 120 of the PPS' acquirer or merchant's acquirer (hereinafter "acquirer 120"). For example, one of the rules in the knowledge base may be determining whether the request was authorized based on device fingerprinting as authentication in the offline mode. In one implementation, the acquirer 120 is a bank or financial institution that processes payments (e.g., credit or debit card payments) and may assume risk on behalf of a merchant 103 or a plurality of merchants 103 aggregated by and represented under PPS 116. The acquirer 120 sends the fund transfer request to the computer system 122 of a card payment network (e.g., Visa, MasterCard, Discover or American Express) (hereinafter "card payment network 122") to determine whether the transaction is authorized or deficient in any other way. In some implementations, PPS 116 may serve as an acquirer and connect directly with the card payment network 122. The card payment network 122 forwards the data to the computer system of an issuing bank 124. The issuer 124 is a bank or financial institution that offered a financial account (e.g., credit or debit card account) to the buyer 102 or 102A. The issuer makes a determination as to whether the buyer 102A has the capacity to absorb the relevant charge associated with the payment transaction.

Each of the aforementioned computer systems can include one or more distinct physical computers and/or other processing devices which, in the case of multiple devices, can be connected to each other through one or more wired and/or wireless networks. All of the aforementioned devices are coupled to each other through the communications network 118, including the Internet, intranet, a cellular network, a local area network, a wide area network, or any other such network, or combination thereof. Protocols and components for communicating over such a network are well known and are not discussed herein. Furthermore, PPS 116, the POS terminal 104, and the mobile device 107 and 105 can also communicate over the communications network 118 using wired or wireless connections, and combinations thereof. The payment transaction is either approved or rejected by the issuer 124 and/or the card payment network 122, a payment authorization message is communicated from the issuer to the merchant computing device 104 via a path opposite of that described above.

When the transfer of the funds is successful, the transaction is assumed to be processed or completed. Accordingly, a receipt is generated for the user to indicate completion of transaction and details of transaction as proof of purchase. The PPS 116 can also update the inventory and manage employee information related to employee that performed the purchase, for example assign tips, or hourly rate, etc. The PPS 116 can also merchant location and customer information for future reference.

The above system or process may not work as expected if there are any technical faults in the way the payment processing system operates, or even the POS system 101. The merchant can contact the PPS or troubleshoot himself or herself by updating settings on devices or applications connected to the PPS. However, the merchant may not be sufficiently knowledgeable to handle the technical fault or even describe the issue. To this end, the network environment 100 described herein is configured to not just detect an issue, its troubleshooting path and then establish communication channel at a time convenient to both the merchant and the service agent, but also execute automated diagnostic tests to address the issue. In one implementation, the merchant notices a technical failure, fault or any other issue in a payment entity, such as the POS system 101 or application 114 and contacts the PPS through a button or icon provided on the device or application's display, such as display 112. A state machine 136 can detect issue with a user-associated device (which in one example can be the same as user's communication device 105 with which the communication is being made with the service agent 109 and/or can be POS system 101) when a first communication is initiated by the user, such as the merchant 103, where detection includes obtaining details of hardware and software configuration of selected applications executing on the device or devices associated with the user. The state of the payment entity is sent to the PPS 116, for example in an encrypted form, as state 130. The state 130 indicates the issue or technical failure of the payment entity. The PPS 116 can also determine a level of skill required for troubleshooting the detected issue based on complexity of the detected issue, along with a level of priority ranging from High to Low. If the skill level satisfies a threshold, PPS 116 determines, from its database 140, if there is a known troubleshooting path that can be remotely applied or recommended without establishing merchant and service agent's device communication, and if there is no known troubleshooting path, PPS 116 generates an troubleshooting path for the user to implement and subsequently, notify the troubleshooting path to the user through email, phone call, text, or the like, along with a self-guided instruction set The threshold can be based on past interactions with this or other merchants. If the skill level does not satisfy a threshold, the communication scheduler 140 determines, for example, through predictive analyses the merchant availability and/or service agent availability, for example based on historical data, such as transaction history stored under merchant profile 142 and preferences of the service agent stored in PPS 116 (not shown), and generate the troubleshooting path for the service agent and merchant. The PPS 116 then establishes communication between the service agent's and the merchant's communication devices. If the merchant is unavailable to receive the communication or disconnects the established communication, the scheduler 140 determines the next slot of availability for both the service agent 109 and the merchant 103. The next slot may be determined based in availability of both the user and the service agent and/or the categorization of the issue. Alternatively, instead of detecting a disconnection initiated by the merchant, in some cases, the scheduler 140 may check whether the predicted available slot is a viable option, for example, at a time before the call is scheduled to happen. For this, the scheduler 140 in combination with the activity monitor 138 detects an event (for example, the merchant is performing an activity on the device or application and is in the middle of payment processing through activity tracking, or on the move detected through location tracking), the scheduler 140 can wait until the detected event is finished or attempt to call at a related number or device.

Once the merchant 103 does confirm that the time is convenient and the communication is established between the merchant and the service agent, that is the call is connected, the service agent's device (for example a communication device of the service agent) generates an additional notification through the PPS 116 to appear on user's device 101. That notification arrives, for example, immediately, during and for the duration of the communication requesting temporary access to the user's activity within the mobile application. On receiving an engagement from the merchant 103 approving access, the service agent's device or server triggers the mobile application to enter a mode in which it relays information about its state and the user's actions back to the server, for presentation to the support agent 109. In this way, there is no need for the difficult and cumbersome process of describing what to look for in the application and what feedback the application is providing in response. The application could also take screenshots of itself and relay those to the support representative for more complete visual feedback.

In one implementation, the PPS 116 also includes a diagnostic component (not shown) to compare past states (obtained when the user first attempts to establish communication) and current state (obtained when the user finally connects with the server). On comparing, if the states of the device and/or software application are different, for example due to software updates or change of settings during the two call events, the server 116 may initiate a request for restoring the state or for updating the troubleshooting path accordingly.

For at least the processes described above, the scheduler 140 also facilitates generation and display of notifications, alerts, and selectable fields for the user and the service agent on a graphical user interface associated with their communication devices. For example, the user's communication device 107 can include within the mobile application 114 an option to request support by establishing connection with a service agent, for example by tapping a software or hardware button on the device or within the mobile application 114. Thus, a selectable icon when selected can place a call to the service agent 109, for example. In another implementation, the selectable icon when selected contacts the PPS 116 with state 130 including contextual information. The contextual information includes the device information, including the type of device on which the application is running, the hardware and software settings, the communication ports open for communication like Bluetooth, Wi-Fi, the device configuration, and so on; the software application information, including the version of application, software application configuration, other applications executing on the device; any indication of virus or malware, software settings, and so on; the user's information, including their phone number (which is associated with their account), any other devices associated with the user, the user's PAN, user's transaction history over a period of time, trends in transaction history, location, geographical location of stores, history of software downloads, and so on; contextual information about the user's issuer, e.g. what version of the application is running, what screen is being viewed, and what information was presented for which support was offered; the user's selection of call-back options, e.g. use an alternate phone number, call back ASAP, or call back in a certain time window offered by the server.

The graphical user interface on display 112 can also present push notifications or messages to the user; "Square is ready to handle your support request. Is now a good time for the phone call?" with attached actions (e.g., "Yes, call now" to show availability, or "Not right now, call in ten minutes" for rescheduling, "Don't need assistance," if the user has figured out a solution), and so on. A directly placed call could only be answered or ignored, whereas a notification can offer and relay user responses.

If the users selects "Yes" then the incoming call would arrive immediately, connecting the user with a service agent that already has access to all the relevant information supplied when the request was initially made. If the user selects "Later . . . " then the application is opened with a new set of callback options: "Try again in 5 minutes", "Try again between 3-4 PM" (for example), and "Cancel this support call." The latter option would show a set of options for the user to provide feedback on why they no longer need support, e.g. "The problem went away," "I figured it out on my own," and "I will contact support again later." In one implementation, if the user does not engage with the selectable icon for a predetermined time, the lack of interaction can be assumed to be equivalent to deferring 5 minutes, then to the next callback window on a subsequent ignore, then canceling the request on a final ignore. After placing their request, the user would also be provided the option to add the company's phone number to their device's address book, so that when the call arrives, it will be identified by name. The following paragraphs show the various components that explain operation of the PPS 116 in detail.

Figure 2:
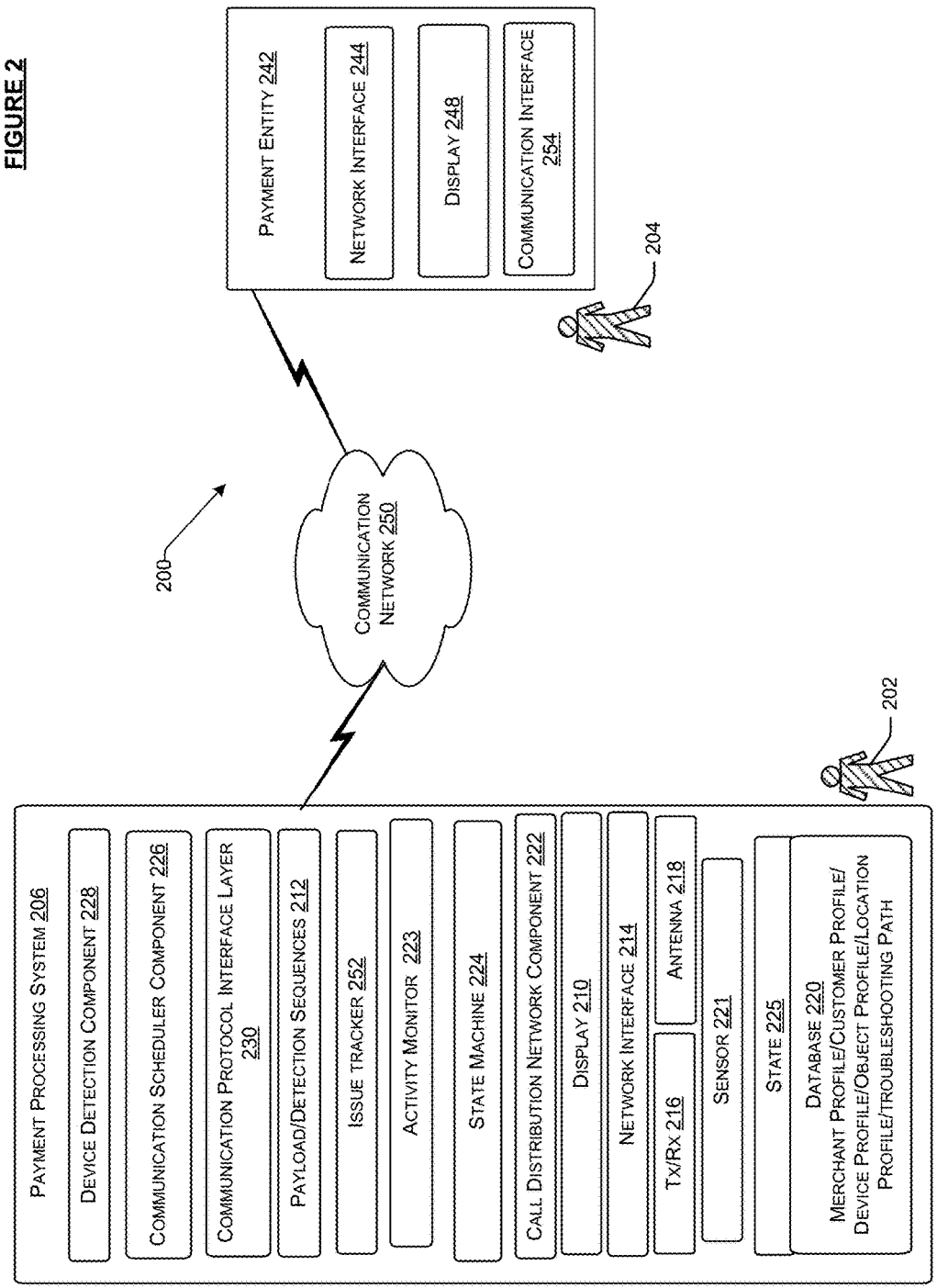
FIG. 2 illustrates various components within the payment object reader and the POS terminal and the payment processing system that enable scheduling of communication between a merchant and a service agent, according to an embodiment of the present subject matter.

FIG. 2 is a diagram illustrating a system configured for technical support ticket creation and resolution, according to an embodiment of the present subject matter.

As shown in FIG. 2, example system 200 illustrating systems and methods to report technical faults with a payment object reader 202, POS terminal 204, or POS application executing on either of the devices, and to generate appropriate troubleshooting paths to resolve the fault, according to an implementation of the present subject matter. In the figure, the payment object reader 202 is shown to include certain components. It will be understood that some or all components can be included in the POS terminal, e.g., POS terminal 104. Alternatively, the components may be distributed between the POS terminal 104 and the payment processing system 206. The payment processing system 206 may have limited memory and may only receive cached data when analyzing but otherwise the cached data and components may be stored in the POS terminal 104.

In one implementation, the payment processing system (PPS) 206 includes one or more components configured specifically to allow the PPS 206 to detect a device or applications, such as payment entity 242, and its corresponding device characteristics, profiles, signatures, or fingerprints and store as state along with timestamp at which state status is obtained.

The components include, for example, a display 210, an issue tracker 252, a network interface 214, a transmitter-receiver 216, an antenna 218, a sensor 221, a call distribution network component 222, and a state machine 224. As shown, the payment processing system 206 also includes an activity monitor 223, communication scheduler component 226, a device detection component 228, a communication protocol interface layer 230, an issue tracker 252, and payload or detection sequences 232. As mentioned before, in one implementation, these components can be part of a POS terminal, such as POS terminal 104, connected to the payment processing system 206. The entity 242 may a payment application (not shown), antenna and transmitter-receiver as part of network interface 244. The payment entity has device characteristics that include but are not limited to: timing parameters, radiated performance, wireless performance, quality of communication links, radio frequency response, transmission measurements, receiver measurements, and engineering tolerances. The communication interface 254 includes ports that can be hardware or software implementations, and can allow the payment entity to communicate with other entities, such as PPS 206, for example the merchant 204 can communicate with the service agent 202 through communication established via communication interface 254. The payment entity also includes a display 248 where visual cues may be represented to the merchant 204. In one implementation, the communication network 250 can be used to communicatively couple the payment entity 242 with the PPS 206, and/or the merchant 204 with a service agent 202.

In one implementation, the activity monitor 223 is configured to query the payment entity 242 at periodic or predetermined time intervals. In another implementation, the activity monitor 223 can query the PPS 242 at random time intervals to determine the time window when it is idle, i.e., not engaged in a transaction. The activity monitor monitors activity (such as transaction activity, movement activity for example movement from one location to another) to determine trends when the merchant may be available to communicate, and stores such trends in merchant profile. In one implementation, an activity monitor tracks activity on the POS terminal 104 and payment object reader within a specified period of time For example, the activity monitor can track the transactions being declined at the POS terminal 104 or transactions being processed.

In one implementation, the device detection component 228 is configured to detect devices through physical device characteristics 239, such as mechanical and operational differences, associated with a device accompanying a merchant. The communication protocol interface layer 230 includes various communication protocol interfaces available to the payment processing system 206 with which it can interact with other wireless devices, e.g., merchant associated devices. The device detection component 228 is also configured to generate a state, such as a profile or a signature 225 of the communication device in response to a received device characteristic, and to determine issues or technical faults in the payment entity 242. The state is mapped known issues saved in database 220. Device identification processes can also be accomplished locally in isolation at the payment object reader level without interaction or communication with external devices (e.g., RFID tag readers and POS devices or other wireless network access points). This isolation reduces the risk of electronic pick pocketing of device information that can occur when payment devices are continually in wireless communication with external devices.

The device detection component 228 may also accompany request for information with specific sequences or payload 212, which it generates or modifies based on the available communication ports. The payload 212 may either be common between all devices being registered or unique for each payment entity. The payload 212 can be a data signal or a series of instructions that trigger the payment entity 242 or certain components, like the transmitter or sensors, to respond. The nature of responses from the payment entity or the content therein can be unique based on the issue. The responses from the selected devices can also be in the form of affirmative or negative answers to queries from the payment entity 241. The responses, whether binary or textual information, can be conditioned.

The state machine 224 performs at least the tasks performed by the device detection component 228 and also tracks the state of the device at each query. For example, each time an issue is detected or highlighted and each time the device is queried, a new state may be obtained by the state machine 224. The states are stored, with a timestamp, in state 225. The communication scheduler component 226 determines activity generated by the activity monitor 223 and tracks availability of both the merchant 204 and the service agent 202, for example by accessing calendars, or by tracking real-time activity on a communication device connected to them. Accordingly, the component 226 schedules a time window(s) for the agent 202 and the merchant 204 to communicate. The communication scheduler component 226 can also make this determination based on merchant or service agent preferences stored in their profiles in the database 220. The communication scheduler component 226 can send the availability information as calendar invitations or as notifications on text, email, or the like. The communication scheduler component 226 can send such availability to a call distribution network component 222. In an example, the automated call distribution systems 222, a private branch exchange (PBX) routes incoming customer telephone calls to individual agent stations. The PBX connects an agent station to a telephone line in response to receiving an incoming client call on the line. The PBX is operated by a control device that insures that the PBX routes each incoming call to an available and suitable agent. The call distribution network component 226 can make the call connection between the merchant of the payment entity and the service agent's communication device, for example through the communication protocol interface layer.

The term "mobile payment application" or "mobile payment portal" as used here, refers to any registration application that enables communication between users (e.g., sender and recipient of a message) over a wired or wireless communications network. The registration application can be employed by a service provider that delivers a communication service to users, e.g., chat capability or capability to request customer support through ticket creation The registration application may include one or more components and/or engines, or a component and/or engine can include one or more applications. The registration application can include, for example, a mobile payment application, a text messaging application for communication between phones (e.g., conventional mobile telephones or smartphones), or a cross-platform instant messaging application for smartphones and phones that use the Internet for communication.

The registration application can also include, for example, a web browser application installed on the payment entity 242 accessible via a uniform resource locator (URL). In some embodiments, the URL is identified by a graphical user interface (GUI) of a mobile payment application installed on the entity 242.

Figure 3:
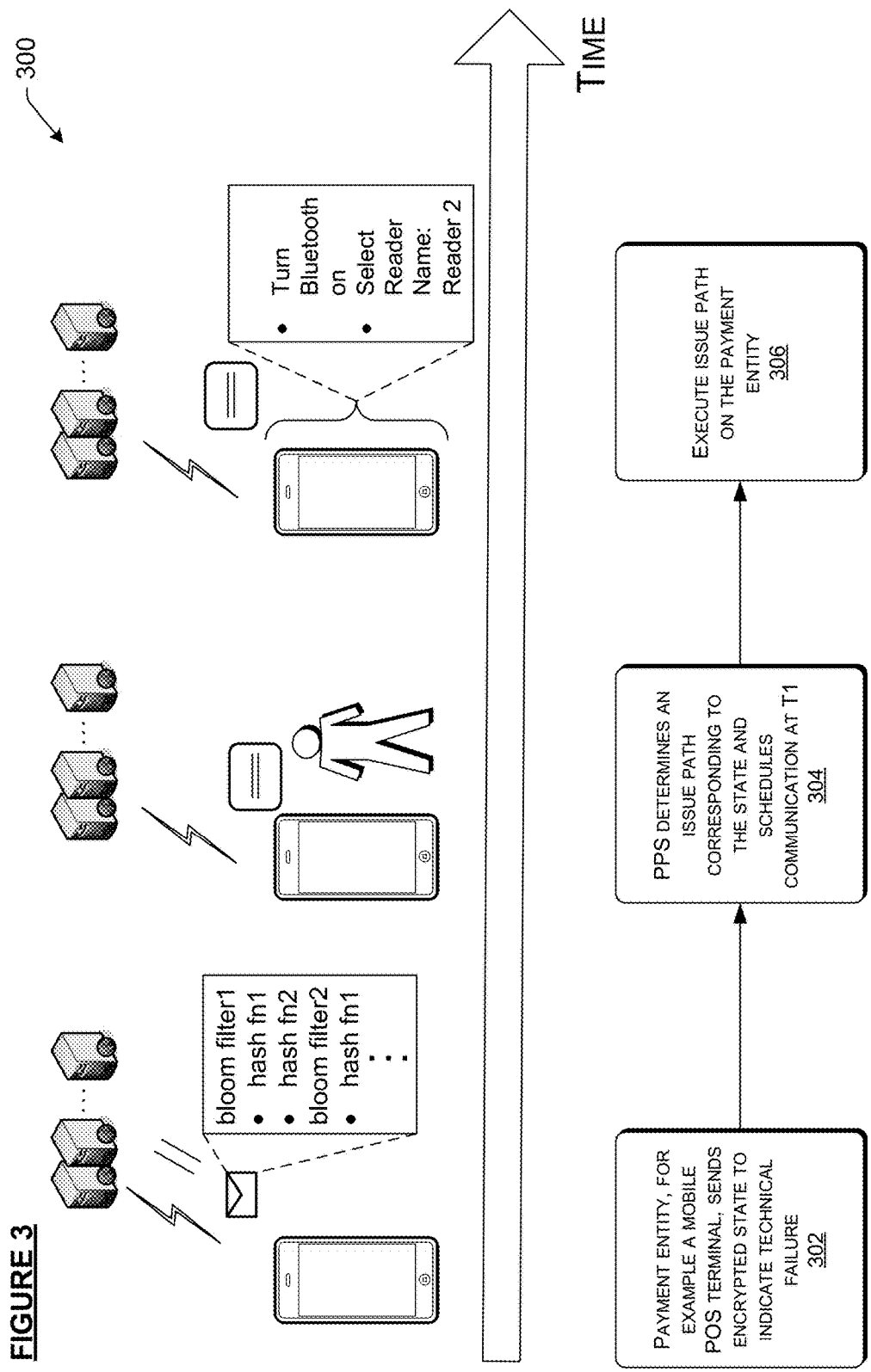
FIG. 3 is a timing diagram that illustrates the timing of various steps of scheduling communication between the merchant and the service agent, according to an example embodiment of the present subject matter.

FIG. 3 illustrates a process 300 for an example scenario showing interaction between a merchant and service agent when the device associated with the merchant has an issue that is causing it to malfunction, according to an embodiment of the present subject matter.

FIG. 3 illustrates, at 302, a merchant communication device sends encrypted data associated with merchant communication device to a payment service such as PPS. Assume that the merchant communication device has installed thereon a mobile payment application, which cannot process transactions received from the payment object reader connected to the device (not shown). The PPS may save the encrypted data in a merchant profile on one or more computing devices. In some embodiments, a merchant may modify the respective merchant profile, and may select a set of criteria to be included in the encrypted data. The set of criteria may include, but is not limited to, information regarding prior payment instrument approval (i.e., designating the customer as trusted), customer information, the time of issue, merchant location and so on. The PPS too requests for data such as error logs and other information in the form of state of device at time T1. In some embodiments, the encrypted data may include information regarding device and application configuration.

As depicted at 302, the data may be encrypted using bloom filters with hash functions. Each bloom filter may be sized based upon the merchant profile of the particular merchant. In various embodiments, the size of a bloom filter (i.e., size of the array and number of hash functions) may be determined based upon a false positive tolerance. In such embodiments, the false positive tolerance may be a factor of the importance of each criterion. Thus, the more important the criterion, the lower the tolerance for a false positive.

At 304, the PPS may determine, based on the state extracted from the encrypted data, whether the troubleshooting path exists to resolve the issue. For example, the PPS determines, based on the state, that the issue relates to a category related to "payment declined at POS terminal." Further on analyzing the error logs, PPS determines that the device is rejecting only NFC based payments. Responsive to such analysis, PPS generates the troubleshooting path that relates to enabling NFC payments on device and sends to the device for execution.

At 306, the merchant executes the steps from the troubleshooting path. The troubleshooting path can be in the form of visual cues to enable the merchant to follow the troubleshooting path as-is. Alternatively, PPS can connect the service agent to the merchant to allow email or phone communication to walk the merchant through steps to enable NFC payments. Such call can be made at time window T2, where T2 is determined by the PPS based on availability of merchant and the service agent. PPS takes into account ongoing transactions or a merchant traveling when scheduling such calls and defers them to another time window T3.

Figure 4:
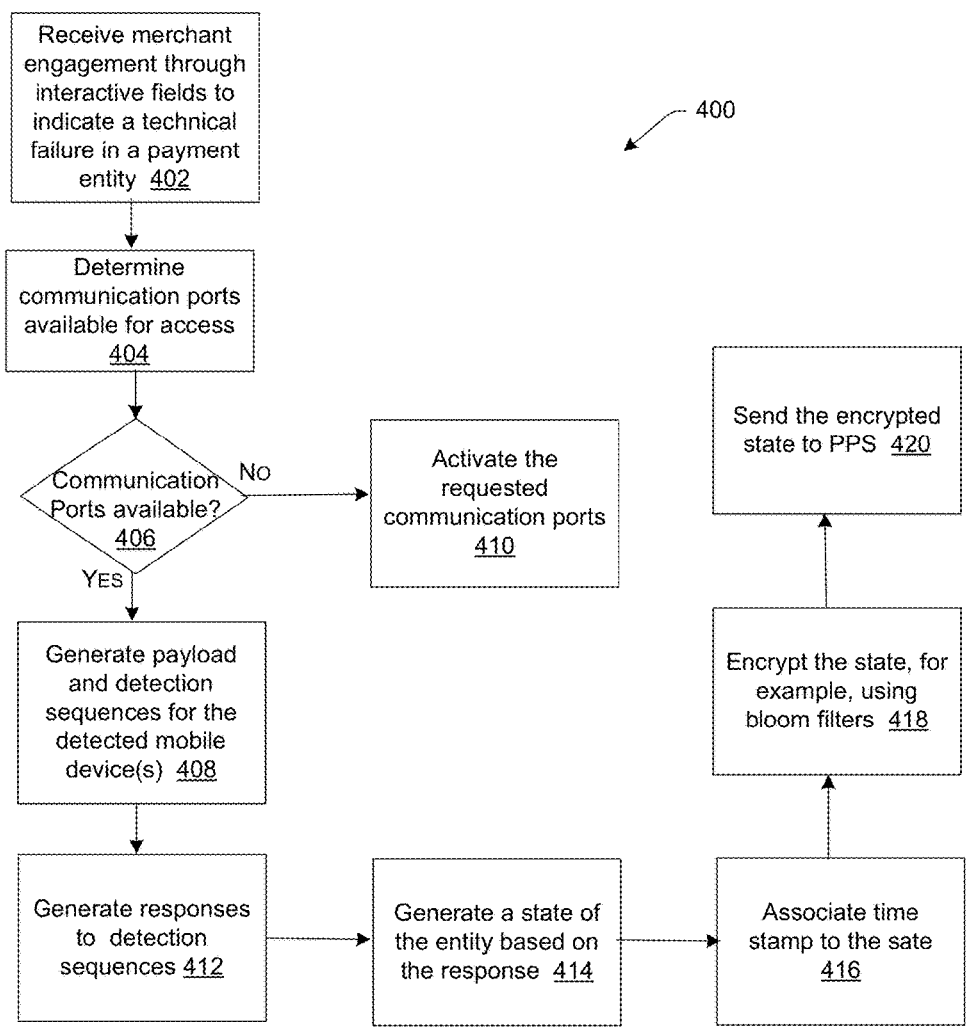
FIG. 4 is a dataflow that illustrates the method of detecting payment entities, such as the payment object reader and the POS terminal, and their states including technical failures, according to an example embodiment of the present subject matter.

FIG. 4 is a sequence flow method that depicts detecting a device registered to a merchant at the time of a first interaction between the merchant and the PPS for technical support, according to an embodiment of the present subject matter. The process 400 can be performed by one or more components, devices, or modules such as, but not limited to, the mobile device, the payment processing system, merchant device or POS terminal, or payment beacon or other components or devices. For the sake of explanation, the description hereinafter is described with reference to components described in FIGS. 1 and 2, such as POS terminal 104 or payment object reader 110. As illustrated in FIG. 4, the process 400 includes a set of operations from step 402 to step 420.

The process 400 starts with the operation at step 402. A merchant 103 indicates through interaction with a software interactive field on the payment application or a physical button on the POS terminal 104 or payment object reader that the merchant 103 wishes to contact technical support for a technical issue in one of the payment devices. In some variations, the devices may generate the technical support ticket if a feature or component of the devices or applications breaks down or stops working as expected. For example, the devices can send error logs to the PPS at predetermined time intervals or contemporaneous to the error. The PPS then generates a technical support request on behalf of the merchant or merchant devices. Even though the description hereinafter mentions payment devices, POS system 101, and payment application, it will be understood that any of the three can use the implementations described herein.

The payment object reader 110 may store the location coordinates of the buyer. The payment processing system 206 scans the payment object that was inserted or otherwise introduced in the payment processing system 206. For example, the payment processing system 206 scans the payment object information, e.g., the last four of the card data (step 406).

At step 408, after obtaining card information, the payment processing system 206 proceeds to detecting location of the POS system 101 through location detection techniques, such as techniques based on triangulation, trilateration, multi-laterations, geo-fence, global or local positioning systems, and the like. This step may be performed contemporaneous to the step of scanning the payment object.

The payment object reader 110 then determines how it can interact with the recognized buyer device or devices. For this, the payment processing system 206 sends preliminary signals or data to explore communication ports in the device, which are available for access and communication (step 404). If there is even one communication port available as determined in step 406, the flow control moves to step 408. In some cases, the payment object reader may detect a number of communication ports that are available or can be made available on request. In such cases, the merchant selects a communication port. In other cases, the selection process can be automated such that ports that meet certain conditions are enabled or used. For example, only power-saving or time-saving communication channels are set up.

If no ports are available for access, the flow transitions to step 410 where the merchant is notified to activate certain ports to allow communication. Such notifications may be sent through text or push notifications. After activation, the flow either moves to 406 for confirmation or directly to 408.

At step 408, the device detection component 228 of the PPS generates payload and/or detection sequences adapted based on the available communication ports and in accordance with the communication protocols on which the ports operate. The payload and detection sequences can be configured based on type of the POS system 101 (such as the type of terminal—Android based, iOS based and so on). In some implementations, a unique payload is generated every time. The detection sequences can be in the form of specific signals requesting the device to respond in a certain way or to release certain information, such as version number, error logs, and the like.

The targeted payment device processes the payload and detection sequences via the appropriate communication ports and protocols (step 412) and responds accordingly. Thus, based on the detection sequences and payload, the payment device responds in a certain manner and generates state of the device at T1, which is captured by the sequences or payload or some other signal and stored, for example, in a payment object reader or sent to the POS terminal via the same or a different communication channel. Step 414. The device state is stored as state value at first time, T1, i.e., the first time merchant established communication with the PPS for technical support. The detection sequences can also be information-gathering requests configured to obtain state, for example in the form of digital device fingerprints, from the payment devices. Device state also includes radio, mechanical or operational fingerprints—such as radiated performance, device defects, sensor performance, communication speed or lags, spectrum data, the location and time of the transaction or buyer, or the card information, open communication ports, settings of applications, the number of applications running on the devices, memory usage, virus identification, and the like (step 416).

At step 418, the device state at T1 may be encoded at the payment device level. The payment device can also apply tokenized pseudo-random numbers (also referred to as hash keys) to the feature vectors to generate the digital device fingerprint. A National Institute of Standard and Technology (NIST) compliant True Random Number Generator (TRNG) can generate the pseudo-random numbers. The encoding can also be done based on keys generated by a cryptographic unit (not shown). Examples of keys include authentication keys, which include SCP03 master keys (Message Authentication Code Key: MAC, Encryption Key: ENC and Key Encryption Key: KEK, which are 256-bit Advanced Encryption Standard (AES) symmetric keys with associated key derivation data) or Key Agreement Keys (e.g., user server signature verification public key, user server static public key, user static key pair with both public and private key). The encrypted state can also be created using other schemes, such as fuzzy vault algorithm, a cancelable fuzzy vault scheme based on irreversible hash functions, such as MD, RIPEMD, and SHA.

In some implementations, the device state may be encrypted using bloom filters with hash functions. The bloom filter may use the hash functions to store information about a merchant or a customer without the risk of the merchant or customer's payment instrument identifier being stolen or otherwise used in a nefarious manner (e.g., through reconstruction). In various embodiments, the hash functions hash or map the customer's payment instrument identifier (i.e., an element) to designated array positions of a bloom filter array to test whether the criterion is met (i.e., a positive match occurs when all of the mapped-to array positions have a value of one "1"; no match occurs, and the criterion is not met, if any of the array positions contain a zero ("0")). In some embodiments, the device state may be truncated to a number less than the standard 16 or 17-digit identifier number. For example, the hash functions may truncate a payment instrument identifier to a 10-digit number, and map the 10-digit number to the bloom filter array. Though bloom filters with hash functions are described herein, it is imagined that the other encryption techniques may be used to maintain the security of state, such as hash tables, simple arrays, and the like. In various embodiments, the POS device may incorporate a plurality of bloom filters, each designated to determine if the ticket meets one or more criteria of a particular merchant. The criteria may be based on issue level, number of tickets sent over a period of time, transaction history, customer data, customer device information, and/or merchant history. For example, a bloom filter and/or hash function may be designated to determine that a merchant has multiple readers and POS terminals at one location (e.g., a VIP merchant). In some embodiments, the POS device may incorporate one bloom filter (for a particular merchant) with one or more hash functions, each hash function configured to determine if the ticket satisfies one or more criteria. Each bloom filter may be sized based upon the merchant profile of the particular merchant.

In various embodiments, the size of a bloom filter (i.e., size of the array and number of hash functions) may be determined based upon a false positive tolerance. In such embodiments, the false positive tolerance may be a factor of the importance of each criterion. Thus, the more important the criterion, the lower the tolerance for a false positive.

In various embodiments, the merchant and/or PPS may designate a tolerance by inputting a probability percentage for false positives (i.e., a merchant will tolerate a 1% chance of a false positive). The tolerance may be set for all bloom filters in a merchant profile, or it may be set per criterion. For example, a bloom filter designated to determine whether a ticket may be sized such that the probability of a false positive is relatively high (i.e., >1%). Whereas a bloom filter designated to determine if a payment instrument identifier is associated with a fraudulent transaction may be sized for a low probability of false positives (i.e., <1%).

In various embodiments, the payment device may comprise at least a merchant application for processing transactions. The merchant application may receive and store data from the merchant profile. In some embodiments, the merchant application may process and save transaction data locally on the payment device.

While in other implementations, the device state obtained at T1, which are to be used for device identification and testing at a later time, are then sent to the PPS, as a new technical support request, as shown in step 420.

Figure 5A:
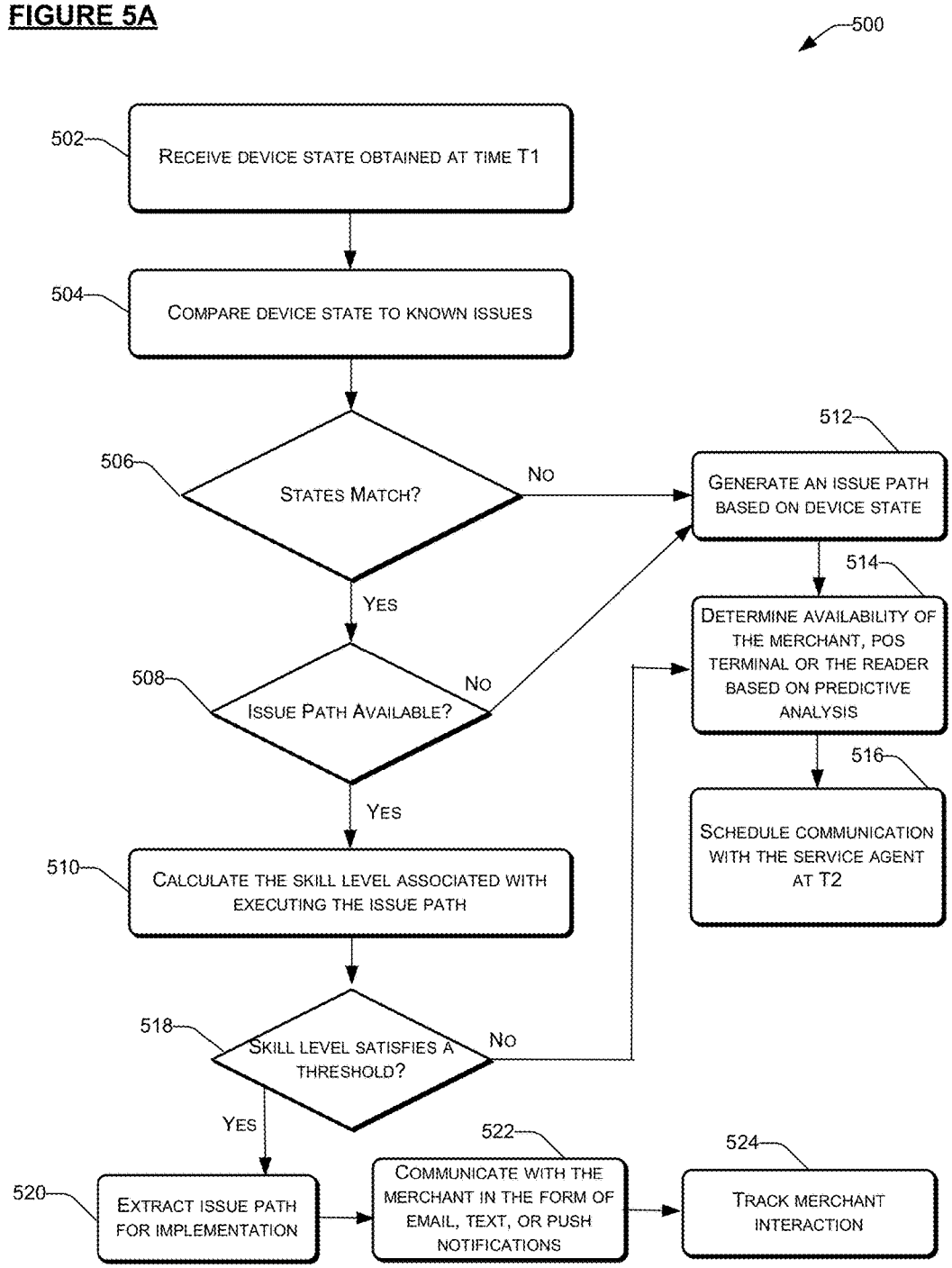

FIGS. 5A and 5B are sequence flow methods that depict a method 500 for identifying an issue detected in a device or application associated with the merchant for which the technical support ticket has been generated, according to an embodiment of the present subject matter. The process 500 can be performed by one or more components, devices, or modules such as, but not limited to, the mobile device, the payment processing system, merchant device or POS terminal, or payment beacon or other components or devices. For the sake of explanation, the description hereinafter is described with reference to components described in FIGS. 1 and 2, such as POS terminal 104 or payment object reader 105. As illustrated in FIGS. 5A and 5B, the process 500 includes a set of operations from step 502 to step 548.

The process 500 starts with the operation at step 502. The PPS 116 receives a technical support ticket including device state at time T1 from the payment devices associated with the merchant. The device state may be encrypted as described in step 420. In such case, the ticket having device state is first decrypted using technologies.

The PPS 116 then compares the device state at time T1 with issues previously identified by the PPS 116 at, for example, other merchant locations (step 504). This helps in applying established known paths to recurring issues. In some cases, the PPS 116 also determines the priority of the issue based on preliminary analysis of the device state or based on whether the same device state is being reported by multiple locations. For example, a network or server fault can trickle to all devices and as such an issue being reported from multiple merchants within a time window triggers PPS 116 to elevate priority of the issue to "High" from "Medium" or "Low".

If the match operation (step 506) as a result of the comparison at step 504 yields a "Yes," the flow transitions to step 508. First, the PPS 116 identifies that a similar state exists in the PPS 116 stored either at an earlier interaction with the same or different merchant or stored by PPS 116 as part of knowledge base 144. Then, the PPS 116 further determines whether an troubleshooting path exists corresponding to the state (step 508). Alternatively, the PPS 116 confirms to check whether there are any rules associated with the device, which restrict interaction with the device or indicate additional merchant preferences with relation to communication.

If the match operation (step 506) as a result of the comparison at step 504 yields a "No," the PPS 116 generates an troubleshooting path corresponding to the device state or optionally, transfers the control to a service agent for further analysis (step 512) and then to step 514.

At step 508, the PPS 116 checks for available troubleshooting paths. In the customer support context, as PPS 116 receives tickets from merchants, PPS 116 can select an troubleshooting path corresponding to a category. The PPS performs categorizations of cases (in the form of calls) to one or more categories (also referred to as troubleshooting paths). The categories (or troubleshooting paths) constitute a first group of categories. PPS can select one or more of the first group of categories to which the particular ticket can be assigned. This can be done in a number of different ways. The first group of categories can be in the form of automatic menu selections provided in the PPS 116. Alternatively, the first group of categories can be provided in some graphical user interface available to a service agent. The identification of the category or categories selected may be made by directly selecting one or more items from a list, such as by using a mouse or keyboard-controlled cursor or by typing in names, numbers, or other codes indicative of the category or categories.

In the self-help context, the merchant instead can perform the categorization. For example, the web page that the merchant accesses to request support can present a list of options (corresponding to the first group of categories) that are selectable by the customer to make the desired categorization.

If the troubleshooting path is available, the flow transitions to step 510.

Figure 6:
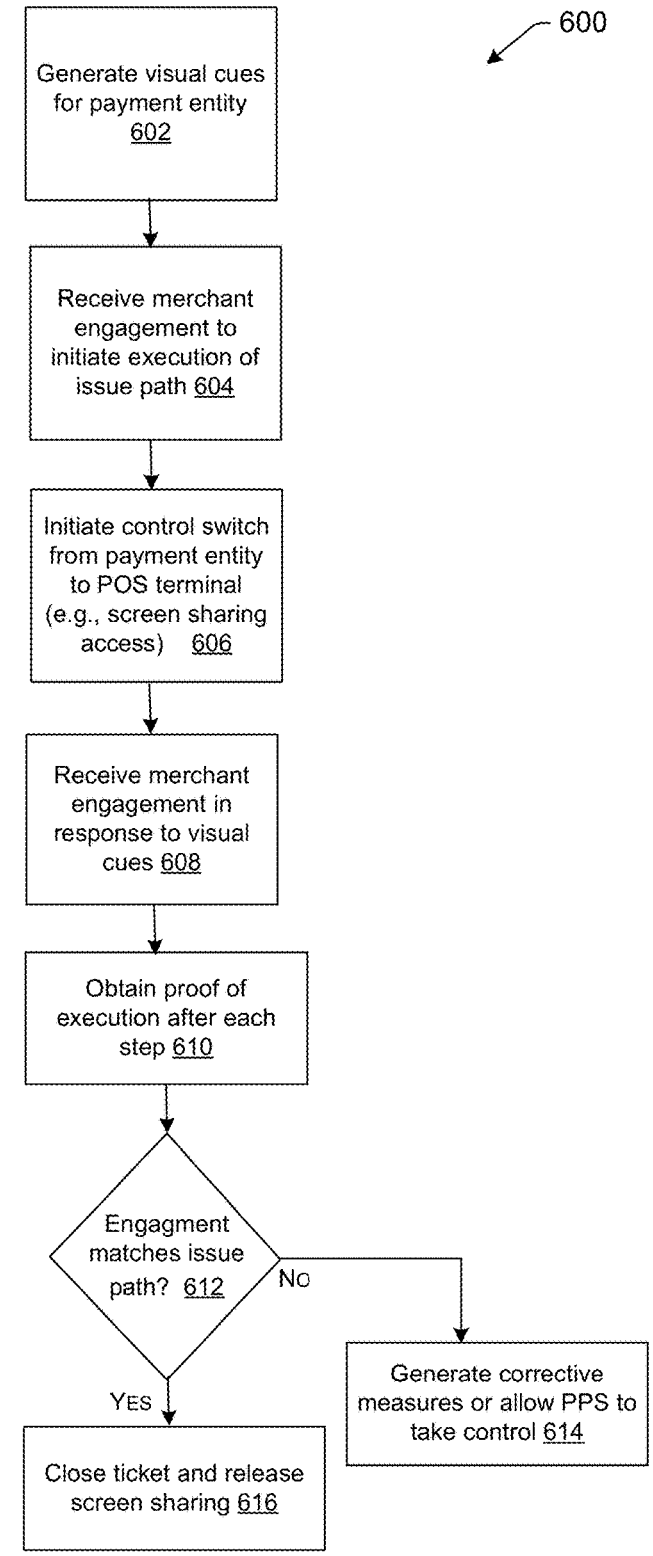
FIG. 6 is a dataflow that illustrates the method of opening a ticket on behalf of the payment entities, such as the payment object reader and the POS terminal, and executing troubleshooting path to resolve the technical failure, according to an example embodiment of the present subject matter.

At step 518, the PPS determines whether identifies level of skill associated with execution of troubleshooting path and/or priority level of the ticket. If the skill level or the priority level satisfies a threshold, for example, if the priority level is low and if skill level indicates that a person with limited technological knowledge can process, the transition flows to step 520. The threshold can be set by the PPS based on historical data and feedback from merchants. However, if the condition in 510 is not met, the flow transitions to step 514, where connection between PPS and service agent is performed. For this, the PPS performs predictive analysis based on activity monitor associated with the merchant (for example through merchant account showing merchant transaction history, merchant location tracking, merchant's availability if indicated in the ticket, and so on) and of the service agent (for example through a communication distribution network) to determine a window of time T2 to establish a communication channel when both the merchant and the service agent can communicate. In some cases, at this point, multiple time windows can be calculated besides T2, such as T3, T4, for example each window may be 10 minutes apart. In some implementations, the support window time frames can be set in a merchant account as restrictions. Thus, the restrictions can define the time and/or manner in which the merchant prefers to be communicated and when. Conditions on the time of use of the device can include, for example, limiting to or exclusion of specific dates or date ranges, specific days of the week, specific time ranges within a day (e.g., "11:00 AM to 2:00 PM" or "lunchtime"), etc., or any combination thereof. Conditions on the manner of use of the device can include, for example, limiting to or exclusion of specific merchants or types/categories of merchants (e.g., restaurants); limiting to or exclusion of particular goods or services; setting call only for a maximum amount per transaction, or per merchant, or per merchant per transaction (which could apply to a specific merchant or to all merchants); limiting to or exclusion of a particular location or locations, etc., whether a service agent is dedicated to the merchant, or any combination thereof. Further, the merchant can be allowed to specify exceptions to some or all of the conditions at the time of registration of devices and applications. Hence, the conditions can be in the form of a whitelist (allowable items), or a blacklist (non-allowable items), or a combination thereof. At least some of the conditions may be hyperlinked to take the merchant to additional pages/screens so as to allow the buyer to define more-specific conditions. The communication between the PPS and the payment devices is scheduled for time window T2. FIG. 6 describes the subsequent steps in detail.

Going back to step 518 where the skill level has satisfied a threshold. The PPS 116 extracts the troubleshooting path corresponding to the issue indicated in the ticket or identified by the PPS as per device state at T1. In some implementations, the PPS 116 can modify the troubleshooting path as per merchant's preferences. Such preferences can be stored under merchant profile (step 520).

At step 522, the PPS 116 communicates the troubleshooting path in merchant selected or default means of communication. For example, the PPS 116 sends a step-wise instructions, or troubleshooting path, to the merchant on the POS devices or another device registered to the merchant, in the form of email, text, hyperlink, or push notifications visually showing step-by-step process to diagnose and close the ticket.

At step 524, the PPS 116 can re-establish connection with the payment devices to track merchant interaction with the troubleshooting path recommendation to ensure that the troubleshooting path is being correctly followed. This is explained in detail in subsequent figures.

As shown in step 526, at the indicated time window T2, when PPS is supposed to establish connection with the merchant's devices, the PPS 116 determines whether the merchant is actually available to talk. For example, the PPS may query the devices or monitor the account to determine whether a transaction is currently happening or the merchant has engaged an option on their device to indicate that they are busy. For example, on sending a push notification to the merchant indicating a call is about to be connected, the merchant is presented with "call later," "call 5 minutes later," "call tomorrow," or "call not needed." In some cases, the merchant can even ignore the notifications and not reply at all. In this case, the PPS can set a default option when ignored, say, it may attempt to call every 10 minutes for 2 times and then close the ticket as unresolved due to merchant unresponsiveness. If the merchant engagement is received as in step 528, the PPS 116 establishes the communication channel between the merchant and the service agent at time T2 (step 530). PPS, at this time, re-obtains the device state at T2, shown in step 532. If the device state at T1 is substantially similar to device state at T2 (step 534), the troubleshooting path known is executed by the PPS 116, for example by requesting control of the devices or through merchant interactions (step 536). Once the PPS confirms correct execution of the troubleshooting path in response to the ticket, the ticket is closed at 538.

Going back to step 534, if the states at T1 and T2 are substantially different, the PPS determines an troubleshooting path for T2, for example either saved as known troubleshooting path or by generating a new troubleshooting path (step 540). After that, PPS 116 compares the troubleshooting path corresponding to state at T1 and the state at T2 (step 542). Accordingly, the PPS generates a combination, addition, subtraction, or otherwise representation of the two troubleshooting paths (step 544). In some cases, the PPS analyzes the troubleshooting paths and generates a path that is based on the most current state, that is the state at T2. The states may vary if the merchant has himself or herself tried to troubleshoot or installed a new version of application and so on. In some cases, the new version can cause the ticket to be closed as shown in step 538.

Going back to step 528, if the merchant engagement indicates that merchant engagement is not received and/or the merchant is unresponsive, PPS 116 extracts from the merchant profile information pertaining to how the merchant when the merchant can be communicated, for example, based on transaction history. For example, PPS on monitoring the activity can determine a new time window T3 to set up the communication channel (steps 546 and 548). At step 542, the step 526 is repeated until merchant picks up. If the merchant does not respond, say for a default number of times, the PPS can close the ticket as unresolved.

FIG. 6 is a sequence flow method that depicts a method 600 for detecting whether or not a troubleshooting path is being executed as directed by the PPS on a device or application associated with the merchant for which the technical support ticket has been generated, according to an embodiment of the present subject matter. The process 600 can be performed by one or more components, devices, or modules such as, but not limited to, the mobile device, the payment processing system, merchant device or POS terminal, or payment beacon or other components or devices. For the sake of explanation, the description hereinafter is described with reference to components described in FIGS. 1 and 2, such as POS terminal 104 or payment object reader 110. As illustrated in FIG. 6, the process 600 includes a set of operations from step 602 to step 616.

The process 600 starts with the operation at step 602. The PPS 116 receives a technical support ticket including device state at time T1 from the payment devices associated with the merchant for which the PPS generates troubleshooting path for resolution of the issue. The troubleshooting path is a set of instructions, which are converted into notifications, such as push notifications. The push notifications are sent to the payment device or the device associated with the merchant. For example, the PPS presents on the interface of the payment device real-time and customized instructions, such as, "press a button located at the bottom of the reader," "turn the device off for five seconds" "register your device at this time," "move the device an inch closer to the terminal," "do you need additional assistance?" "connecting to a support representative," "your bank has approved registration," and so on. To this end, the merchant 109 submits user engagement input in response to each of the configuration instructions while the PPS waits. Other examples of user engagement input include providing authentication or security keys as a visual, audio or haptic input.

At step 604, the merchant engages with the device or the notifications or both to start the process. In response to merchant engagement for the first time or at the time of engagement, the PPS initiates a mode switch. The modes are switched from merchant control to at least view, edit, or collect mode. In collect mode, PPS can collect information related to merchant engagement, for example in the form of screenshots or actual screen sharing (step 606).

At step 608, PPS receives merchant engagement in response to troubleshooting path. In some cases, the PPS can request control from the merchant and automatically execute certain or all steps described in the troubleshooting path. For example, the PPS can automatically push certain updates or delete data from the devices to rectify the problem.

At step 610, PPS obtains screenshots or otherwise information indicating merchant's actions and device's state after each step of the troubleshooting path. This is helpful if last known and working state needs to be restored. At step 612, PPS matches the engagement as reflected in the screenshots with the troubleshooting path sent to the payment device. If there is a match, that is, "yes" branch of the step 612, PPS continues to check all steps and releases control when issue is resolved after execution of all steps. If issue pertains, the methods described in FIGS. 4 and 5 may be re-executed, but say without a trigger from merchant.

At step 616, however, if the PPS determines that the engagement does not match with the troubleshooting path, either the PPS takes control, for example for automatic execution of troubleshooting path or under authority of a service agent. In another case, the PPS can generate notifications to alert the merchant that a wrong step has been performed and to re-execute the last step, while restoring to the last known good state.

Unless contrary to physical possibility, it is envisioned that (i) the methods/steps described above may be performed in any sequence and/or in any combination, and that (ii) the components of respective embodiments may be combined in any manner. Note that any and all of the embodiments described above can be combined with each other, except to the extent that it may be stated otherwise above or to the extent that any such embodiments might be mutually exclusive in function and/or structure.

Although the present subject matter has been described with reference to specific example embodiments, it will be recognized that the subject matter is not limited to the embodiments described, but can be practiced with modification and alteration within the spirit and scope of the appended claims. Accordingly, the specification and drawings are to be regarded in an illustrative sense rather than a restrictive sense. It will thus be appreciated that those skilled in the art will be able to devise various arrangements that, although not explicitly described or shown herein, embody the principles of the present subject matter. Furthermore, all examples recited herein are intended to be for illustrative purposes only to aid the reader in understanding the principles of the present subject matter, and are to be construed as being without limitation to such specifically recited examples and conditions. Moreover, all statements herein reciting principles, aspects, and embodiments of the present subject matter, as well as specific examples thereof, are intended to encompass equivalents thereof.

What is claimed is:

1. A computer-implemented method for scheduling communication between a merchant associated with a point-of-sale (POS) terminal and a service agent associated with a payment processing system (PPS), the method comprising:
    providing, by a processor of the PPS, an engagement option on a user interface of a POS application executing on the POS terminal, the engagement option which when selected by the merchant indicates a technical failure;
    detecting, by the processor of the PPS, an indication of the technical failure of a POS application executing on the POS terminal or a payment object reader connected to the POS terminal, wherein the detection is based at least on an interaction between the merchant and the engagement option;
    obtaining, by a state machine of the PPS, a current state of the POS application or the payment object reader in response to the detected indication of the technical failure;
    generating, by a processor of the PPS, a ticket including the current state, wherein the ticket indicates a merchant's request to establish communication of the PPS with the POS terminal or the merchant with the service agent;

obtaining, by a processor of the PPS, transaction history and transaction activity associated with the POS terminal;

predicting, by the processor of the PPS and using the transaction history, a time window within which the merchant or the POS terminal will be available to communicate with the PPS or service agent;

monitoring, a status of a current transaction on the POS terminal within the time window and prior to establishing communication between the PPS and the POS terminal;

wherein if the status indicates the current transaction has been completed or POS terminal is idle, establishing a communication channel between the POS terminal and the PPS during the time window; and wherein if the status indicates that the current transaction is in progress,
deferring the establishment of the communication channel to another time window, wherein the other time window is determined by the PPS based on the status of the current transaction, the transaction history or on a merchant-specified time window; and
establishing the communication channel between the POS terminal and the PPS during the other time window;

and wherein in response to establishing the communication channel between the POS terminal and the PPS either at the time window or the other time window, executing one or more remedial steps based on the identified troubleshooting path to resolve the technical failure and close the ticket.

2. The method of claim 1, further comprising:
obtaining, by the state machine of the PPS, a new state of the POS application or the payment object reader at the other time window or the time window when communication channel is established;
comparing the current state with the new state; and
if the current state is substantially different from the new state, generate another troubleshooting path in response to the new state, wherein the other troubleshooting path includes known remedial steps associated with the technical failure corresponding to the new state.

3. The method of claim 1, further comprising:
generating another troubleshooting path having active content to facilitate remediation of the technical failure or self-repair, wherein the other troubleshooting path when executed further examines the POS terminal or the payment object reader, and wherein the active content includes content selected from a plurality of content types, the plurality of content types including frequently asked questions, release notes, support notes and at least one URL to a Web technical support resource;
causing, by the PPS, execution of the other troubleshooting path on the POS terminal or the payment object reader; and
determining a new state of the POS application or the payment object reader after the execution of the troubleshooting path to confirm whether or not the technical failure has been resolved.

4. The method of claim 3, further comprising:
obtaining indication of execution after each of one or more steps of the other troubleshooting path; and
comparing the indication with the steps of the other troubleshooting path to confirm proper execution of the other troubleshooting path.

5. A method for scheduling communication between a payment entity and a payment processing system (PPS), the method comprising:
receiving, by a processor of the PPS, an indication of an issue related to the payment entity;
obtaining, by a state machine, a current state of the payment entity in response to the received indication;
predicting, by the processor of the PPS and based on a merchant profile, a time window within which a merchant associated with the payment entity will be available to communicate with a service agent associated with the PPS;
monitoring a status of the payment entity or the merchant within the time window and prior to establishing communication with the payment entity or the merchant;
wherein if the status of the payment entity or the merchant indicates the payment entity is not available for communication at the predicted time window,
determining another time window, wherein the other time window is determined by the PPS based on the status of the payment entity, a transaction history or on a merchant-specified time window; and
establishing a communication channel between the payment entity and the PPS during the other time window.

6. The method of claim 5, further comprising:
comparing, by the state machine of the PPS, the current state of the payment entity with one or more known issues stored in the PPS;
on receiving a match between the current state and the one or more known issues, determining whether a troubleshooting path exists for the current state;
wherein if the troubleshooting path exists, further determining a skill level associated with execution of the troubleshooting path;
wherein if the skill level satisfies a threshold, generating one or more visual cues to facilitate the merchant in resolving the issue as per the troubleshooting path; and
wherein if the skill level does not satisfy the threshold, requesting, by the PPS, control of the payment entity and remotely execute the troubleshooting path after receiving control to resolve the issue.

7. The method of claim 5, further comprising, wherein the payment entity includes a POS application executing on a POS terminal or on a mobile communication device associated with the merchant, or a payment object reader connected to the POS terminal.

8. The method of claim 6, further comprising configuring the payment entity for a diagnostic mode, wherein configuring includes:
receiving merchant engagement in response to the visual cues indicated on the payment entity;
comparing the merchant engagement to the visual cues;
determining that the payment entity was not modified in accordance with the visual cues; and
in response to the determining, restoring configuration of the payment entity to a configuration before the merchant engagement and re-generating the visual cues for new merchant engagement.

9. The method of claim 5, further comprising:
generating a troubleshooting path having active content to facilitate diagnosis of the issue or self-repair, wherein the troubleshooting path when executed further examines the payment entity, and wherein the active content includes content selected from a plurality of content types, the plurality of content types including frequently asked questions, release notes, support notes and at least one URL to a Web technical support resource;

causing, by the PPS, execution of the troubleshooting path on the payment entity; and determining a new state of the payment entity after execution of the troubleshooting path to confirm whether or not the issue has been resolved through the execution of the troubleshooting path.

10. The method of claim 5, further comprising:

obtaining, by the state machine of the PPS, a new state of the payment entity at the other time window or the time window when the communication channel is established;

comparing the current state with the new state; and if the current state is substantially different from the new state, generating a troubleshooting path in response to the new state.

11. The method of claim 5, wherein the communication is one of email, text or voice communication.

12. The method of claim 5, wherein the current state includes one of: radio, mechanical or operational fingerprints, radiated performance, device defects, sensor performance, communication speed, communication lags, spectrum data, location and time of a transaction or buyer, payment object information, open communication ports, settings of one or more software applications, a number of applications running on the payment entity, memory usage, virus identification, and error logs.

13. The method of claim 5, further comprising:

classifying, with a categorizer trained using a search-and-confirm technique, the issue into a category from amongst one or more known categories;

assigning a computing device of the service agent with the issue based on the category, wherein the service agent is dedicated to resolving issues in the category to which the issue pertains;

tracking, through an activity monitor, whether the payment entity is involved in an activity, wherein the activity includes processing a payment transaction or indicates movement; and scheduling establishment of the communication channel after the activity is completed.

14. A payment processing system configured for facilitating diagnosis of a payment entity, the payment processing system comprising:

a state machine configured to obtain a current state of the payment entity; and a communication scheduler component, executed by a processor, configured to:

determine, by a point-of-sale (POS) wireless transceiver, a first value of signal strength corresponding to a current position of the payment entity;

predict, by the processor of the payment processing system and based on a merchant profile, a time window within which a merchant associated with the payment entity is available to communicate with a service agent associated with the payment processing system;

monitor a status of the payment entity or the merchant within the time window and prior to establishing communication with the payment entity or the merchant;

wherein if the status of the payment entity or the merchant indicates the payment entity is not available for communication at the time window, determine another time window, wherein the other time window is determined by the payment processing system based on the status of the payment entity, transaction history or on a merchant-specified time window; and establish a communication channel between the payment entity and the payment processing system during the other time window.

15. The payment processing system of claim 14, further comprising an accelerometer to track motion of the payment entity at the time window or other time window.

16. The payment processing system of claim 14 further comprising a graphical user interface configured to provide visual cues to configure the payment entity for a diagnostic mode, wherein configuring the payment entity includes:

receive merchant engagement in response to the visual cues indicated on the payment entity;

compare the merchant engagement to the visual cues;

determine that the payment entity was not modified in accordance with the visual cues; and in response to the determination, restore configuration of the payment entity to a configuration before the merchant engagement and re-generate the visual cues for new merchant engagement.

17. The payment processing system of claim 14, wherein the current state includes one of: radio, mechanical or operational fingerprints, radiated performance, device defects, sensor performance, communication speed, communication lags, spectrum data, location and time of a transaction or buyer, payment object information, open communication ports, settings of one or more software applications, a number of applications running on the payment entity, memory usage, virus identification, and error logs.

18. The payment processing system of claim 14, wherein the state machine is further configured to:

obtain a new state of the payment entity at the other time window or the time window when the communication channel is established;

compare the current state with the new state; and if the current state is substantially different from the new state, generate another troubleshooting path in response to the new state.

19. One or more non-transitory computer-readable media maintaining instructions that, when executed by one or more processors, program the one or more processors to:

receive, by a processor of the a payment processing system (PPS), an indication of an issue related to a payment entity;

obtain, by a state machine, a current state of the payment entity in response to the received indication;

predict, by the processor of the PPS and based on a merchant profile, a time window within which a merchant associated with the payment entity is available to communicate with a service agent associated with the PPS;

monitor a status of the payment entity or the merchant within the time window and prior to establishing communication with the payment entity or the merchant;

if the status of the payment entity or the merchant indicates the payment entity is not available for communication at the predicted time window, determine another time window, wherein the other time window is determined by the PPS based on the status of the payment entity, a transaction history or on a merchant-specified time window; and establish a communication channel between the payment entity and the PPS during the other time window.

20. The one or more non-transitory computer-readable media of claim 19, wherein the instructions further program the one or more processors to:
   obtain, by the state machine of the PPS, a new state of the payment entity at the other time window or the time window when the communication channel is established;
   compare the current state with the new state; and
   if the current state is substantially different from the new state, generate a troubleshooting path in response to the new state.

21. The one or more non-transitory computer-readable media of claim 19, wherein the instructions further program the one or more processors to:
   generate a troubleshooting path having active content to facilitate diagnosis of the issue or self-repair, wherein the troubleshooting path when executed further examines the payment entity, and wherein the active content includes content selected from a plurality of content types, the plurality of content types including frequently asked questions, release notes, support notes and at least one URL to a Web technical support resource;
   cause, by the PPS, execution of the troubleshooting path on the payment entity; and
   determine a new state of the payment entity after the execution of the troubleshooting path to confirm whether or not the issue has been resolved.

22. The one or more non-transitory computer-readable media of claim 19, wherein the instructions further program the one or more processors to:
   compare, by the state machine of the PPS, the current state of the payment entity with one or more known issues stored in the PPS;
   upon receiving a match between the current state and the one or more known issues, determine whether a troubleshooting path exists for the current state;
   wherein if the troubleshooting path exists, further determine a skill level associated with execution of the troubleshooting path;
   wherein if the skill level satisfies a threshold, generate one or more visual cues to facilitate the merchant in resolving the issue as per the troubleshooting path; and
   wherein if the skill level does not satisfy the threshold, request, by the PPS, control of the payment entity and remotely execute the troubleshooting path after receiving control to resolve the issue.

* * * * *